United States Patent
Cappitelli et al.

(10) Patent No.: US 11,250,377 B2
(45) Date of Patent: Feb. 15, 2022

(54) DEVICE AND METHOD FOR SUPPLYING SPARE PARTS OF AN AIRCRAFT

(71) Applicant: Airbus Operations GmbH, Hamburg (DE)

(72) Inventors: Mario Cappitelli, Hamburg (DE); Oliver Tormählen, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 235 days.

(21) Appl. No.: 16/521,177

(22) Filed: Jul. 24, 2019

(65) Prior Publication Data

US 2020/0042930 A1 Feb. 6, 2020

(30) Foreign Application Priority Data

Jul. 31, 2018 (DE) .......................... 102018118471.9

(51) Int. Cl.
*G06Q 10/08* (2012.01)
*G06Q 50/28* (2012.01)
*G06Q 10/00* (2012.01)
*G06Q 30/06* (2012.01)

(52) U.S. Cl.
CPC ........... *G06Q 10/087* (2013.01); *G06Q 10/20* (2013.01); *G06Q 50/28* (2013.01); *G06Q 30/0631* (2013.01)

(58) Field of Classification Search
CPC ...... G06Q 10/087; G06Q 10/20; G06Q 50/28; G06Q 30/0631; G06Q 20/20
See application file for complete search history.

(56) References Cited

U.S. PATENT DOCUMENTS

| | | | |
|---|---|---|---|
| 6,487,479 B1* | 11/2002 | Nelson | G06Q 10/087 701/29.1 |
| 7,689,468 B2* | 3/2010 | Walker | G06Q 20/04 705/26.4 |
| 2004/0064351 A1* | 4/2004 | Mikurak | G06Q 10/087 705/22 |
| 2006/0047559 A1* | 3/2006 | Jacoby | G06Q 10/06315 705/28 |
| 2007/0156496 A1* | 7/2007 | Avery | G06Q 10/087 705/305 |
| 2008/0154654 A1* | 6/2008 | Niessen | G06Q 30/0241 705/5 |
| 2008/0249870 A1* | 10/2008 | Angell | G06Q 30/0269 705/14.53 |

(Continued)

FOREIGN PATENT DOCUMENTS

EP 1115081 A2 7/2001
WO 2007064856 A2 6/2007

*Primary Examiner* — Florian M Zeender
*Assistant Examiner* — Whitney Poffenbarger
(74) *Attorney, Agent, or Firm* — Greer, Burns & Crain, Ltd.

(57) ABSTRACT

A device and a method for supplying spare parts of an aircraft to a maintenance and/or repair center, such as a hangar. From data of previous transactions with the spare parts and from technical data relating to the spare parts, probabilities are calculated that certain spare parts are needed together, enabling them to be supplied together. According to a further aspect, different vending machines at the maintenance and/or repair center are proposed, with which the spare parts for a maintenance or repair task can be supplied together.

11 Claims, 22 Drawing Sheets

(56) References Cited

U.S. PATENT DOCUMENTS

| | | | |
|---|---|---|---|
| 2010/0161365 A1* | 6/2010 | Lokowandt | G06Q 30/0601 705/7.31 |
| 2010/0162115 A1* | 6/2010 | Ringewald | G11B 27/034 715/716 |
| 2015/0349917 A1* | 12/2015 | Skaaksrud | H04W 8/183 370/328 |
| 2019/0188536 A1* | 6/2019 | Lei | G06K 9/03 |

* cited by examiner

Fig. 5

| Description | | Order Date | Confirmed QTY | Material | Customer | Net Price ae | pro ME | Grossprice | Priority | QTY Delivered | A/C Registration |
|---|---|---|---|---|---|---|---|---|---|---|---|
| SPACER | SPACER AFT FITTING | 31.03.2017 | 2.000 | D52888013892020B | XXC | xx.xx | | | RTN | 2.000 | |
| BOLT | BOLT | 09.02.2017 | 1.000 | D52888013820050B | XXC | xx.xx | 1 EA | xx.xx | RTN | 1.000 | |
| BOLT | BOLT | 28.03.2017 | 4.000 | D52888013823060B | XXS | xx.xx | 1 EA | xx.xx | RTN | 4.000 1t5 | |
| SPACER | SPACER AFT FITTING | 29.03.2017 | 4.000 | D52888013823060B | XXS | xx.xx | 1 EA | xx.xx | RTN | 4.000 1t5 | |
| BOLT | BOLT | 12.04.2017 | 2.000 | D52888013892020B | XXD | xx.xx | 1 EA | xx.xx | RTN | 2.000 | |
| SPACER | SPACER AFT FITTING | 12.04.2017 | 7.000 | D52888013892020B | XXD | xx.xx | 1 EA | xx.xx | RTN | 7.000 | |
| BOLT | BOLT | 25.04.2017 | 2.000 | D52888013892060B | XXA | xx.xx | 1 EA | xx.xx | AOG | 2.000 7op8 | |
| SPACER | SPACER AFT FITTING | 24.04.2017 | 1.000 | D52888013892060B | XXA | xx.xx | 1 EA | xx.xx | AOG | 1.000 7op8 | |
| BEARING | BEARING-FLEXIBLE | 24.08.2017 | 20.000 | NSA5407-10A | XXW | xx.xx | | xx.xx | AOG | 20.000 3tk5 | |
| BEARING | BEARING-FLEXIBLE | 15.05.2017 | 1.000 | NSA5607-10A | XXE | xx.xx | | xx.xx | AOG | 0.000 8t68 | |
| SPACER | SPACER AFT FITTING | 25.04.2017 | 6.000 | D52888013892020B | XXF | xx.xx | 1 EA | xx.xx | RTN | 8.000 | |
| SPACER | SPACER AFT FITTING | 07.05.2017 | 2.000 | D52888013892060B | XXR | xx.xx | 1 EA | xx.xx | AOG | 2.000 t8t8w | |
| NUT | NUT | 11.08.2017 | 100.000 | NSA5059-8 | XXG | xx.xx | | xx.xx | USR | 100.000 | |
| BOLT | BOLT | 03.03.2017 | 1.000 | D52888013892020B | XXH | xx.xx | 1 EA | xx.xx | AOG | 1.000 5-tk52 | |
| BOLT | BOLT | 10.02.2017 | 2.000 | D52888013892060B | XXN | xx.xx | 1 EA | xx.xx | USR | 2.000 | |
| BEARING | BEARING-FLEXIBLE | 01.04.2017 | 1.000 | NSA5607-10A | XXJ | xx.xx | 1 EA | xx.xx | AOG | 1.000 7x7u | |
| SPACER | SPACER AFT FITTING | 29.03.2017 | 1.000 | D52888013892020B | XXJ | xx.xx | 1 EA | xx.xx | AOG | 1.000 tkop00 | |
| SPACER | SPACER AFT FITTING | 31.07.2017 | 2.000 | D52888013892020B | XXU | xx.xx | 1 EA | xx.xx | RTN | 2.000 | |
| SPACER | SPACER AFT FITTING | 13.07.2017 | 2.000 | D52888013892020B | XXU | xx.xx | 1 EA | xx.xx | RTN | 2.000 | |
| WASHER | WASHER | 10.07.2017 | 100.000 | NSA5305-8 | XXP | xx.xx | | xx.xx | AOG | 100.000 10lu | |
| NUT | NUT | 28.02.2017 | 12.000 | NSA5059-8 | XXL | xx.xx | | xx.xx | USR | 12.000 | |
| BEARING | BEARING-FLEXIBLE | 04.04.2017 | 10.000 | NSA5607-10A | XXY | xx.xx | | xx.xx | AOG | 10.000 575b | |
| BOLT | BOLT | 14.02.2017 | 1.000 | D52888013892060B | XXK | xx.xx | | xx.xx | USR | 1.000 55er | |
| NUT | NUT | 13.02.2017 | 10.000 | NSA5059-8 | XXK | xx.xx | 1 EA | xx.xx | USR | 10.000 55er | |
| BOLT | BOLT | 04.07.2017 | 3.000 | D52888013832060B | XXB | xx.xx | 1 EA | xx.xx | USR | 3.000 de45 | |
| BOLT | BOLT | 09.06.2017 | 2.000 | D52888013832060B | XXB | xx.xx | 1 EA | xx.xx | USR | 2.000 875c | |
| WASHER | WASHER | 05.04.2017 | 11.000 | NSA5305-8 | XXI | xx.xx | | xx.xx | USR | 11.000 | |
| NUT | NUT | 05.04.2017 | 11.000 | NSA5059-8 | XXI | xx.xx | | xx.xx | USR | 11.000 | |
| WASHER | WASHER | 17.03.2017 | 10.000 | NSA5305-8 | XXI | xx.xx | | xx.xx | USR | 10.000 | |
| NUT | NUT | 17.03.2017 | 10.000 | NSA5059-8 | XXI | xx.xx | | xx.xx | USR | 10.000 | |

| Description | | Order Date | Confirmed QTY | Material | Customer | Net Price ae | pro ME | Grossprice | Priority | QTY Delivered | AC Registration |
|---|---|---|---|---|---|---|---|---|---|---|---|
| SPACER SPACER AFT FITTING | | 31.03.2017 | 3.000 D5288801382020 | | XXG | xx.xx | | xx.xx | RTN | 2.000 | |
| BOLT BOLT | | 09.12.2017 | 1.000 D5288801382020 | | XXC | xx.xx | 1EA | xx.xx | RTN | 1.000 | |
| BOLT BOLT | | 29.03.2017 | 4.000 D5288801382020 | | XXS | xx.xx | 1EA | xx.xx | RTN | 4.000 t95 | |
| SPACER SPACER AFT FITTING | | 28.12.2017 | 4.000 D5288801382020 | | XXS | xx.xx | 1EA | xx.xx | RTN | 4.000 t95 | |
| | | | | | | | | | | | |
| SPACER SPACER AFT FITTING | | 07.05.2017 | 2.000 D5288801382020 | | XXR | xx.xx | | xx.xx | AOG | 2.000 t899u | |
| NUT NUT | | 11.08.2017 | 100.000 NSA5059-8 | | XXG | xx.xx | 1EA | xx.xx | USR | 100.000 | |
| BOLT BOLT | | 03.03.2017 | 1.000 D5288801382020 | | XXH | xx.xx | 1EA | xx.xx | AOG | 1.000 5:lac52 | |
| BOLT BOLT | | 10.02.2017 | 2.000 D5288801382020 | | XXN | xx.xx | 1EA | xx.xx | USR | 2.000 | |
| BEARING BEARING-FLEXIBLE | | 01.04.2017 | 1.000 NSA5807-10A | | XXJ | xx.xx | | xx.xx | AOG | 0.000 ZtzTu | |
| SPACER SPACER AFT FITTING | | 29.03.2017 | 1.000 D5288801382020 | | XXJ | xx.xx | 1EA | xx.xx | AOG | 1.000 9epp88 | |
| SPACER SPACER AFT FITTING | | 31.07.2017 | 2.000 D5288801382020 | | XXU | xx.xx | 1EA | xx.xx | RTN | 2.000 | |
| SPACER SPACER AFT FITTING | | 13.07.2017 | 2.000 D5288801382020 | | XXU | xx.xx | 1EA | xx.xx | RTN | 2.000 | |
| WASHER WASHER | | 10.07.2017 | 100.000 NSA5205-4 | | XXP | xx.xx | 1EA | xx.xx | AOG | 100.000 108a | |
| NUT NUT | | 28.02.2017 | 12.000 NSA5059-8 | | XXL | xx.xx | | xx.xx | USR | 12.000 | |
| BEARING BEARING-FLEXIBLE | | 04.04.2017 | 10.000 NSA5807-10A | | XXY | xx.xx | | xx.xx | AOG | 10.000 578o | |
| BOLT BOLT | | 14.02.2017 | 1.000 D5288801382020 | | XXH | xx.xx | 1EA | xx.xx | USR | 1.000 55er | |
| NUT NUT | | 13.02.2017 | 10.000 NSA5059-8 | | XXK | xx.xx | | xx.xx | USR | 10.000 55er | |
| BOLT BOLT | | 04.07.2017 | 3.000 D5288801382020 | | XXB | xx.xx | 1EA | xx.xx | RTN | 3.000 der45 | |
| BOLT BOLT | | 09.06.2017 | 2.000 D5288801382020 | | XXB | xx.xx | 1EA | xx.xx | USR | 2.000 | |
| WASHER WASHER | | 05.04.2017 | 11.000 NSA5205-8 | | XXI | xx.xx | | xx.xx | USR | 11.000 875ir | |
| NUT NUT | | 05.04.2017 | 11.000 NSA5059-8 | | XXI | xx.xx | | xx.xx | USR | 11.000 | |
| WASHER WASHER | | 17.03.2017 | 10.000 NSA5205-4 | | XXI | xx.xx | | xx.xx | USA | 10.000 | |
| NUT NUT | | 17.03.2017 | 10.000 NSA5059-8 | | XXI | xx.xx | | xx.xx | USR | 10.000 | |

| Description | Order Date | Confirmed QTY | Material | Customer | Net Price ae | pro ME | Grossprice | Priority | QTY Delivered | A/C Registration |
|---|---|---|---|---|---|---|---|---|---|---|
| SPACER SPACER AFT FITTING | 31.03.2017 | 2.000 | D5288801382026B0 | XXC | xx.xx | | xx.xx | RTN | 2.000 | |
| BOLT BOLT | 09.02.2017 | 1.000 | D5288801382006B0 | XXC | xx.xx | | xx.xx | RTN | 1.000 | |
| BOLT BOLT | 29.03.2017 | 4.000 | D5288801382030B0 | XXS | xx.xx | | xx.xx | RTN | 4.000 1t5 | |
| SPACER SPACER AFT FITTING | 29.03.2017 | 4.000 | D5288801382002B0 | XXS | xx.xx | 1 EA | xx.xx | RTN | 4.000 1t5 | |
| BOLT BOLT | 12.04.2017 | 2.000 | D5288801382006B0 | XXD | xx.xx | 1 EA | xx.xx | RTN | 2.000 | |
| SPACER SPACER AFT FITTING | 12.04.2017 | 7.000 | D5288801382002B0 | XXD | xx.xx | 1 EA | xx.xx | RTN | 7.000 | |
| BOLT BOLT | 25.04.2017 | 2.000 | D5288801382006B0 | XXA | xx.xx | 1 EA | xx.xx | AOG | 2.000 7op8 | |
| SPACER SPACER AFT FITTING | 24.04.2017 | 1.000 | D5288801382002B0 | XXA | xx.xx | 1 EA | xx.xx | AOG | 1.000 7op8 | |
| BEARING BEARING-FLEXIBLE | 24.04.2017 | 20.000 | NSA5607-10A | XXW | xx.xx | | xx.xx | AOG | 20.000 3k5 | |
| BEARING BEARING-FLEXIBLE | 15.05.2017 | 1.000 | NSA5607-10A | XXE | xx.xx | | xx.xx | AOG | 0.000 | 65skt |
| SPACER SPACER AFT FITTING | 25.04.2017 | 6.000 | D5288801382020B0 | XXF | xx.xx | 1 EA | xx.xx | RTN | 6.000 | |
| SPACER SPACER AFT FITTING | 07.05.2017 | 2.000 | D5288801382020B0 | XXR | xx.xx | 1 EA | xx.xx | AOG | 2.000 t588u | |
| | | | | | | | | | 132 | |
| WASHER WASHER | 10.07.2017 | 100.000 | NSA5305-8 | XXP | xx.xx | | xx.xx | AOG | 100.000 1t8u | |
| NUT NUT | 28.02.2017 | 12.000 | NSA50S9-8 | XXL | xx.xx | | xx.xx | USR | 12.000 | |
| BEARING BEARING-FLEXIBLE | 04.04.2017 | 10.000 | NSA5607-10A | XXY | xx.xx | | xx.xx | AOG | 10.000 | 675sn |
| BOLT BOLT | 14.02.2017 | 1.000 | D5288801382006B0 | XXK | xx.xx | 1 EA | xx.xx | USR | 1.000 5Ser | |
| NUT NUT | 13.02.2017 | 10.000 | NSA5059-8 | XXK | xx.xx | | xx.xx | USR | 10.000 5der | |
| BOLT BOLT | 04.07.2017 | 3.000 | D5288801382006B0 | XXB | xx.xx | 1 EA | xx.xx | RTN | 3.000 dev45 | |
| BOLT BOLT | 09.08.2017 | 2.000 | D5288801382006B0 | XXB | xx.xx | 1 EA | xx.xx | USR | 2.000 | 875k |
| WASHER WASHER | 05.04.2017 | 11.000 | NSA5305-8 | XXI | xx.xx | | xx.xx | USR | 11.000 | |
| NUT NUT | 06.04.2017 | 11.000 | NSA5059-8 | XXI | xx.xx | | xx.xx | USR | 11.000 | |
| WASHER WASHER | 17.03.2017 | 10.000 | NSA5305-8 | XXI | xx.xx | | xx.xx | USR | 10.000 | |
| NUT NUT | 17.03.2017 | 10.000 | NSA5059-8 | XXI | xx.xx | | xx.xx | USR | 10.000 | |

DEVICE AND METHOD FOR SUPPLYING SPARE PARTS OF AN AIRCRAFT

CROSS-REFERENCES TO RELATED APPLICATIONS

This application claims the benefit of the German patent application No. 10 2018 118 471.9 filed on Jul. 31, 2018, the entire disclosures of which are incorporated herein by way of reference.

FIELD OF THE INVENTION

The invention relates to a device and a method for supplying spare parts of an aircraft to a maintenance and/or repair center for the aircraft.

BACKGROUND OF THE INVENTION

As with all complex technical products, aircraft, such as airplanes or helicopters or the like, must be regularly maintained. For this purpose, owners of aircraft, such as aviation companies, in particular at airports, maintenance and repair service providers, perform the maintenance operations and/or repairs to aircraft on site. For example, at airports there are hangars in which the aircraft can undergo minor or major inspections. Such hangars are examples of the maintenance and/or repair centers described here.

For maintenance or repairs, spare parts are usually necessary for replacement on the aircraft. Due to the high complexity of modern aircraft, there may be a large number of different maintenance operations or repair operations for which different spare parts are needed.

EP 1 115 081 A2 and WO 2007/064856 A2 specify computer-implemented systems and methods for managing tasks to be carried out by different units in the context of aircraft maintenance.

During a maintenance and repair operation, the aircraft remains at the maintenance and/or repair center. This being the case, it is usually only ascertained in the course of the maintenance which part of the aircraft is in need of replacement. This spare part is then requested and installed after being supplied.

SUMMARY OF THE INVENTION

An object of the invention is to create a device and a method with which the time for which the aircraft must remain at the maintenance and/or repair center can be significantly reduced.

According to a first aspect, the invention creates a device for supplying spare parts of an aircraft to a maintenance and/or repair center for the aircraft, comprising:

a spare part information storage device, which contains information about each available spare part of the aircraft, including a spare part identifier and its installation location relative to other available spare parts, a transaction information storage device, which contains information about previous transactions for each available spare part, a computer unit, a request unit for requesting a spare part, an information output unit, and a supply device for supplying a requested spare part, wherein the computer unit is designed to calculate, for groups of at least two each of the available spare parts, based on the information about previous transactions and the information on the installation location relative to other spare parts, a probability value that a need for a given first spare part from the group will mean that a different spare part from the group is also needed for a given maintenance and/or repair operation, wherein the computer unit is designed, when a spare part is requested, to check whether a probability value that the need for this requested spare part from the group implies that a different spare part from the group is also needed is above a predetermined threshold or not, and, if the probability value for the other spare part is above the threshold, to output the spare part identifier of the other spare part via the information output unit.

It is preferable that the supply device comprises an automatic vending machine at the maintenance and/or repair center, wherein the automatic vending machine comprises a magazine for spare parts to be supplied, and an automatic vending machine output to issue the requested spare part.

The automatic vending machine is preferably configured to provide information about transactions enacted on the automatic vending machine to the transaction storage device.

It is preferable that the magazine contains the particular available spare parts for which a number of transactions, determined from the information obtained from the transaction information storage device, is above a predetermined threshold.

It is preferred that the magazine contains groups of spare parts, in which the probability value that a need for a spare part from the group implies that another spare part from the group is also needed, is above a predetermined threshold.

It is preferable that the magazine contains groups of spare parts and/or tools which are needed together in selectable maintenance and/or repair operations.

It is preferable that the computer unit is configured to determine, for each available spare part on the basis of the information from the spare parts information storage device and/or the transaction information storage device, a demand parameter that specifies how often the spare part is needed at the maintenance and/or repair center, and to issue an instruction to fill the magazine on the basis of the demand parameter.

It is preferable that the automatic vending machine contains at least one tool for exercising a maintenance or repair operation, wherein the tool can be removed from the automatic vending machine by a user by way of a transaction to be enacted on the automatic vending machine.

It is preferable that the supply device comprises a transport device for transporting a requested spare part from a spare parts manufacturer or spare parts supplier to the maintenance and/or repair center.

It is preferable that the supply device, in particular at the maintenance and/or repair center, has a manufacturing device for manufacturing the requested spare part by generative manufacturing.

According to a further aspect, the invention creates a method for supplying spare parts of an aircraft to a maintenance and/or repair center for the aircraft, comprising:

a) supplying spare part information about each available spare part, wherein the spare part information contains a spare part identifier and information about the installation location of the spare part relative to some of the other available spare parts;

b) supplying transaction information about previous transactions for each available spare part, c) calculating, from the transaction information and the spare part information, probability values for groups of at least two each of the available spare parts, wherein the probability value indicates the probability that if a given first spare part is needed from the group, a different spare part from the group is also needed in a maintenance and/or repair operation, d) requesting a first spare part, e) investigating whether a probability value assigned to the first spare part for a grouping with at least one second spare part exceeds a predetermined threshold, and, if the threshold is exceeded, outputting information that the second spare part is probably also needed, and outputting the spare part identifier for the second spare part, and f) supplying the first spare part.

Preferably, the method comprises the step of waiting before step f) whether or not a request is made for a further spare part, and performing step e) also for this additional spare part, wherein all required spare parts are supplied in step f).

It is preferred that step f) contains:

f1) operating an automatic vending machine located at the maintenance and/or repair center, which has a magazine for spare parts to be supplied and an automatic vending machine output to issue the required spare part from the magazine.

The method preferably comprises the step:

storing of transaction information about transactions enacted on the automatic vending machine.

The method preferably comprises the step:

identifying, from the transaction information and/or the spare part information, the number, how often each available spare part has so far been needed, and filling the magazine with those spare parts for which this number is above a predetermined threshold.

The method preferably comprises the step:

stocking groups of spare parts in the magazine, for which the probability value that a need for a spare part from the group means that another part from the group is also needed is above a predetermined threshold, and jointly issuing such a group via the automatic vending machine output.

The method preferably comprises the step:

stocking groups of spare parts and/or tools, which are needed together in a predetermined maintenance and/or repair operation, in the magazine and issuing this group jointly via the automatic vending machine output.

The method preferably comprises the step:

stocking certain tools, which are needed in certain maintenance and/or repair operations, in the automatic vending machine and issuing the tools on request.

It is preferred that step f) contains:

f2) transporting a requested spare part from a spare parts manufacturer or a spare parts supplier to the maintenance and/or repair center.

It is preferred that step f) contains:

f3) manufacturing the requested spare part at the maintenance and/or repair center by means of generative manufacturing.

The method preferably comprises the step of determining for each spare part to be supplied, on the basis of the transaction information and/or the spare parts information, whether step f1) or one of the steps f2) or f3) is carried out in order to supply it.

According to a further aspect the invention relates to a computer program product comprising commands, which during the execution of the program by the computer unit of the device according to one of the preceding embodiments, cause the device to carry out the steps of the method according to one of the preceding embodiments.

One aspect of the invention relates to the technical design of an on-site sales point for spare parts for the maintenance/repair in the aircraft industry. In accordance with one aspect, the sales point can also be used for the sale or loan of special tools required for maintenance and/or repair purposes.

A further aspect of the invention relates to a device and a method which is used to recommend to maintenance and repair personnel to request at least one additional spare part when making a request for a first spare part. In particular, a device and a method for spare part number recommendation for implementing aircraft maintenance operations is proposed.

By means of both measures, which may be provided together or independently of each other, the time taken to supply the spare parts required for certain maintenance and repair purposes is very significantly reduced compared to previous methods, allowing the overall time required for maintenance and repair to be significantly reduced. This leads to a significant increase in the availability of an aircraft for service.

According to an aspect of the invention, a device for supplying spare parts of an aircraft at a maintenance and/or repair center for the aircraft is proposed, which has a supply device for supplying a requested spare part to the maintenance and/or repair center, wherein the supply device comprises an automatic vending machine at the maintenance and/or repair center, the automatic vending machine comprising a magazine for spare parts to be supplied and an automatic vending machine output to issue the requested spare part. This aspect also relates to a method for supplying spare parts of an aircraft at a maintenance and/or repair center for the aircraft, comprising supplying spare parts by means of an automatic vending machine at the maintenance and/or repair center.

According to an aspect, customers of a manufacturer for aircraft for performing maintenance tasks will receive a recommendation for spare part numbers required. The customers can thereby request all required spare parts at the same time, thus significantly reducing the time taken to supply the spare parts.

In particular, during the planning of a particular maintenance—even before the aircraft arrives at the maintenance and/or repair center—spare parts can be requested and deployed in advance.

The device and the method should preferably be designed and configured to identify all spare parts which are expected to be required. If a particular spare part is requested, then preferred embodiments of the device and the method also suggest further spare parts which are expected to be needed.

Preferably, a device and a method are proposed for recommending spare parts to be requested. For this purpose, spare part identifiers such as spare part numbers are issued. A system for suggesting spare parts expected to be required is preferably proposed, which exists as a computer-implemented device and/or as a computer-implemented method and, in particular, simplify the identification of additionally required parts for a single or multiple aircraft maintenance.

Preferred embodiments of the device and the method help maintenance and/or repair organizations to prepare the maintenance and/or repair activities with regard to the required parts in good time. In particular, the number, quality and availability of the required spare parts can be prepared, including logistical requirements. The device and method can preferably be integrated into a network-based operating system. The invention also relates to a network-based operating system which implements the device and method described here in accordance with preferred embodiments.

In companies' sales and procurement departments, data analysis of sales transactions is known. In particular, data mining methods and pattern recognition methods, along with statistical analyses of sales are used for this.

In embodiments of the invention, data on previous transactions with spare parts are prepared using pattern recognition algorithms, data mining algorithms and/or statistical analyses, in order to learn from the requesting behavior of existing customers which parts are usually purchased together. Although these are primarily commercial data, they also have a technical rationale, because the requesting of spare parts that are ordered together usually takes place because these spare parts are required together for certain maintenance and/or repair purposes for technical reasons.

In embodiments of the invention, for the identification of spare parts that are intended to be requested together, it is not the case, however, that only information on previous transactions is evaluated. Instead, technical information about the spare part is also used. In particular, a set of technical maintenance documentation is used to clarify and validate information about sales or other transactions, in order to analyze which of the spare parts that have been particularly frequently requested by previous customers are actually technically used together. The resulting information is then used to output information for each initial spare part, as to which additional spare part is to be requested together with the initial spare part.

The information can also, in particular, be given automatically to the supply device in order to specify groups of spare parts which should be made available together.

BRIEF DESCRIPTION OF THE DRAWINGS

Exemplary embodiments of the invention will be explained below with reference to the attached drawings. These show:

FIG. 5 is an example of data for information about previous transactions with spare parts;

FIGS. 6-7 are the information from FIG. 5 with further annotations;

DETAILED DESCRIPTION OF THE PREFERRED EMBODIMENTS

Figure 1:
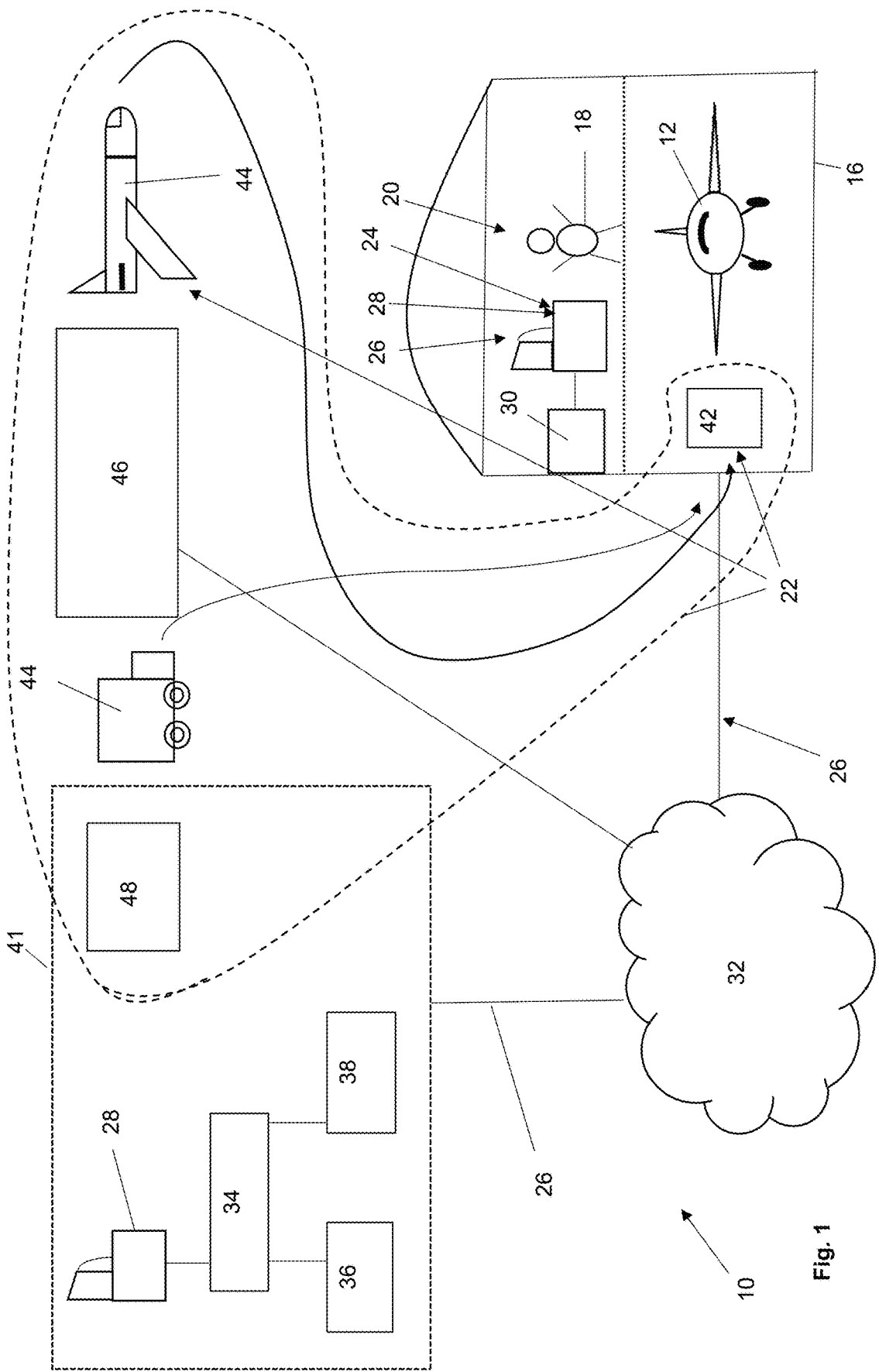
FIG. 1 is a schematic block diagram of an embodiment of a device for supplying spare parts of an aircraft at a maintenance and/or repair center for the aircraft.

FIG. 1 shows a schematic drawing of an embodiment of a device 10 for supplying spare parts of an aircraft 12 at a maintenance and/or repair center 14 for the aircraft 12.

FIG. 1 shows a building in the form of a hangar 16 as an example of the maintenance and/or repair center 14, which can be located, for example, at an airport. At the maintenance and/or repair center 14, personnel 18 of a maintenance and/or repair organization 20 perform maintenance on the aircraft 12. The maintenance and/or repair organization 20 can be, for example, the ground-based engineering organization of an airline, which regularly carries out maintenance and repairs to the airline's airplanes (examples of aircraft 12).

For maintenance and repair, spare parts 40, 50, 60 are normally required, which are supplied by the device 10.

To this end the device 10 has a supply device 22, which transfers the spare parts 40, 50, 60 requested by the personnel 18 at the maintenance and/or repair center 14 to the personnel 18.

Also, the personnel 18 of the maintenance and/or repair organization 20 have access to a request unit 24 to request a replacement part 40, 50, 60.

The device 10 also comprises at least one information output unit 26.

The request unit 24 can be implemented, for example at a terminal or a PC or other user terminal 28 having a user interface, for example a keyboard, touchscreen or the like.

The information output unit 26, or one of a plurality of information output units 26, can also be implemented on the user terminal 28.

The user terminal 28 is connected, for example, to a data processing system 30 of the maintenance and/or repair organization 20. This can be connected to a network 32, for example to the internet, to communicate with other data processing devices.

The device 10 also comprises a computer unit 34, a spare part information storage device 36, and a transaction information storage device 38.

In the exemplary embodiment shown here the computer unit 34, the spare part information storage device 36 and the transaction storage device 38 are positioned at the location of a manufacturer 41 for the aircraft 12 and can be connected via the network 32 to the data processing system 30.

The supply device 22 preferably has an automatic vending machine 42 at the maintenance and/or repair center 14. The automatic vending machine 42 contains, for example, frequently needed spare parts 40, 50, 60 and issues them to the personnel 18 when requested by the request unit 24.

Also, the supply device 22 can have one or more transport devices 44 for the transport of spare parts that are not held in stock at the maintenance and/or repair center 14 from the manufacturer 41 or a spare parts supplier 46 to the maintenance and/or repair center 14.

The supply device 22 may be implemented, in particular, as a computer-implemented logistics system, which on request of a spare part 60 by the request unit 24 ensures a delivery to the maintenance and/or repair center 14 by the required time.

Figure 2:
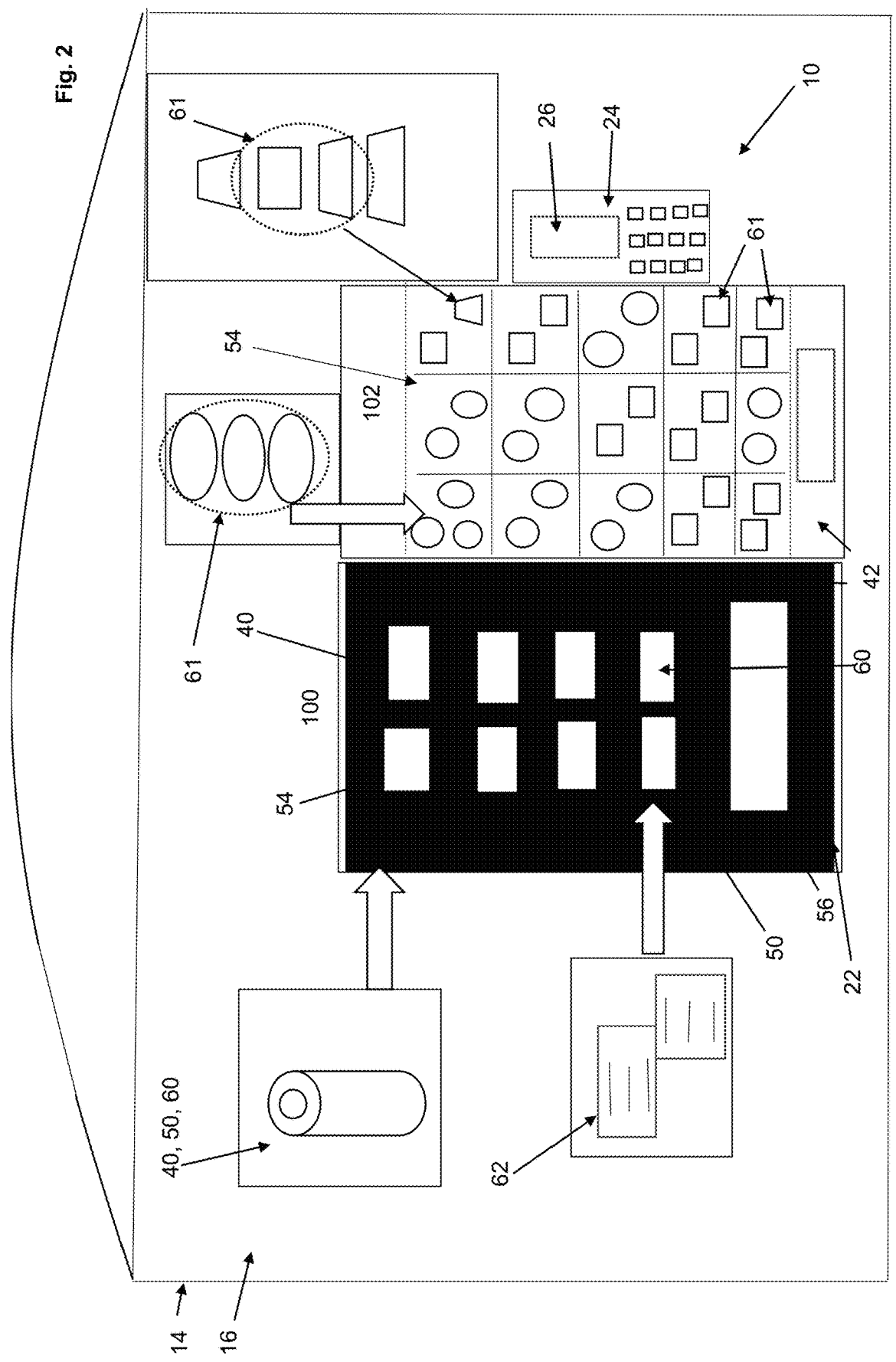
FIG. 2 is an illustration produced partly as photographs and partly as a drawing of an exemplary embodiment of a unit of a supply device for the spare parts located at the maintenance and/or repair center.
Figure 3:
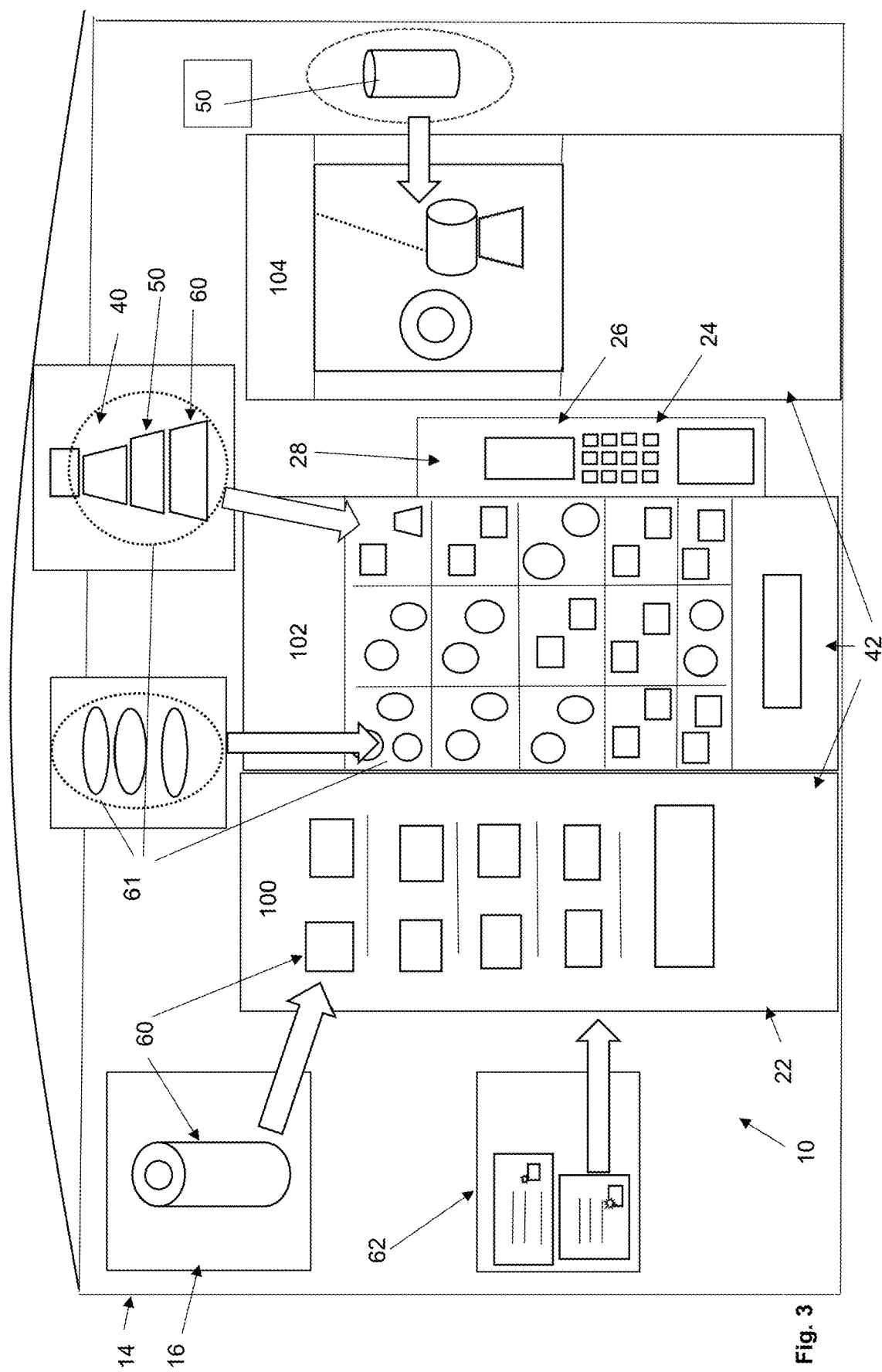
FIG. 3 is a similar representation to FIG. 2 of another exemplary embodiment of the unit of the supply device.

FIGS. 2 and 3 show different embodiments of the automatic vending machine 42.

The embodiment of the supply device 22 shown in FIGS. 2 and 3 is, in particular, a spare-part vending machine for selling spare parts 40, 50, 60 at the point of use.

According to the exemplary embodiments of FIGS. 2 and 3, the automatic vending machine 42 has a single spare-part vending machine 100 and a spare-part group vending machine 102.

More generally, the automatic vending machine 42 has a magazine 54 containing spare parts 40, 50, 60 or groups 61 of spare parts, and an automatic vending machine output 56, where spare parts 40, 50, 60 requested by the personnel 18 can be issued from the magazine 54.

In the embodiment shown in FIG. 2, the automatic vending machine 42 has the most frequently used spare parts 40, 50, 60 stockpiled in the magazine 54. The spare-part group vending machine 102 holds groups 61 of spare parts in the individual magazine compartments, which are needed together for predetermined maintenance and/or repair processes.

Via the request unit 24, which in the embodiments of FIGS. 2 and 3 can also be provided on the automatic vending machine 42, the personnel 18 can thus request a single spare part 60 via the single spare-part vending machine 100, or enter the predetermined maintenance and/or repair operation, whereupon the spare-part group vending machine 102 issues the group 61 of spare parts required for the operation.

In the embodiment shown in FIG. 2, the less frequently needed spare parts which are requested by the personnel 18, but not stocked in the automatic vending machine 42, are supplied, in particular, via the transport device 44.

In the embodiment shown in FIG. 3, the supply device 22 at the maintenance and/or repair center 14 has a spare-part manufacturing device 104 for producing a requested out-of-stock spare part 60 by generative manufacturing. The spare-part manufacturing device 104 can be an additional unit of the automatic vending machine 42.

The automatic vending machine 42 is connected over the network 32 to the computer unit 34 at the manufacturer 40, so that transactions enacted on the automatic vending machine 42 are forwarded to the transaction information storage device 38 for evaluation and further processing by the manufacturer 40.

The corresponding information concerning the transactions can of course be used for administrative tasks, for example for invoicing and accounting purposes and for organization, but also for technical purposes, as is shown in more detail in the text which follows.

In particular, from the information in the transactions for each spare part 40, 50, 60, the number of the requests for this part can be determined. In accordance with the determined result, the most frequently requested spare parts 50, 40, 60 are stocked in the magazine 54.

The automatic vending machine 42 is an exemplary embodiment of a sales point at a maintenance and/or repair center 14 for the aircraft 12, set up by a maintenance and/or repair organization 20.

The automatic vending machine 42 is used to supply required spare parts 40, 50, 60 through different types of vending machines 100, 102, 104.

The automatic vending machine 42 enables the sale of individual spare parts 60 for standard spare parts required immediately, via the single spare-part vending machine 100.

The automatic vending machine 42 also allows the supply of pre-selected and bundled spare parts—groups 61—for implementing a predefined maintenance and/or repair task.

In the embodiment according to FIG. 3, the automatic vending machine 42 also enables production of spare parts 40, 50, 60 on request by means of generative manufacturing, for example using 3D printing, or an additive-layer manufacturing.

According to a preferred embodiment, the automatic vending machine 42 not only supplies spare parts 40, 50, 60. The automatic vending machine 42 can also be used to supply special tools 62 for carrying out a particular maintenance and/or repair task. This can be carried out, for example, by their sale using the automatic vending machine 42. An example of such a special tool 62 to be purchased is that of cleaning tools.

Other special tools 62, for example a special gauge or handling equipment for handling specific devices on the aircraft 12, can also be obtained from the automatic vending machine 42 on a loan basis, and then also returned via the automatic vending machine output 56.

In order to fill the magazine 54 and optimize the stocking of the spare parts 40, 50, 60 and, in particular, for pre-grouping the spare parts 40, 50, 60 for the spare-part group vending machine 102, in particular data-mining algorithms and pattern recognition algorithms, as well as statistical analyses based on previously conducted transactions stored in the transaction storage device 38 are carried out, and, in particular, compared against technical data, as will be explained further below.

The supply of spare parts 60 at the maintenance and/or repair center 14 is thus poised and efficiently managed, to enable the maintenance and/or repair task to be performed quickly and, in particular, without waiting times. This increases the availability of the aircraft 12 for its owner.

For example, different maintenance tasks will need to be carried out for the maintenance of an aircraft 12, wherein specific spare parts 60 will be removed and replaced.

The most frequently required spare parts 60 are supplied via the single spare-part vending machine 100 at the maintenance and/or repair center 14.

Based on the technical documentation available for virtually every aircraft 12 of the individual parts of the aircraft 12, and based on previous transactions with spare parts 40, 50, 60—for example previous requests or sales—groups 61 of spare parts can also be identified, for which are there is a high probability they will be required together for certain maintenance and/or repair procedures. The way this is carried out will be described in more detail in the following.

Such groups 61 of spare parts 40, 50, 60 and/or special tools 62, which are usually required together, can be supplied together via the spare-part group vending machine 102.

Using the automatic vending machine 42, spare parts 40, 50, 60 can be supplied from all the different material groups. These can be spare parts 40, 50, 60 which originate from the manufacturer 41 of the aircraft 12 and are also specifically provided by them. They can also be spare parts 40, 50, 60 from other spare part suppliers 46, such as fixings, seals or standardized parts. However, items such as chemicals (lubricants, cleaning agents, fillers, etc.) or the like, can also be supplied.

In the configuration of FIG. 3, less frequently used spare parts 60 are supplied by using an additive-layer manufacturing printing machine—spare-part manufacturing device 104—in addition to the vending machines 100, 102 at the maintenance and/or repair center 14. The data for manufacturing the non-stocked requested spare part can be delivered from the manufacturer 41 via the network 32.

Machine learning systems are preferably used in the computer unit 34, so that the computer unit 34 automatically learns which spare parts 40, 50, 60 on the automatic vending machine 42 are needed most in order to optimize preliminary filling and refilling operations.

Also, technical documentation is used to examine technical correlations between spare parts 40, 50, 60 and so to predict which spare parts 40, 50, 60 are expected to be needed together.

The appropriate calculations can be carried out in the computer unit 34. These processes will be explained in further detail below with the aid of the remaining figures.

Figure 4:
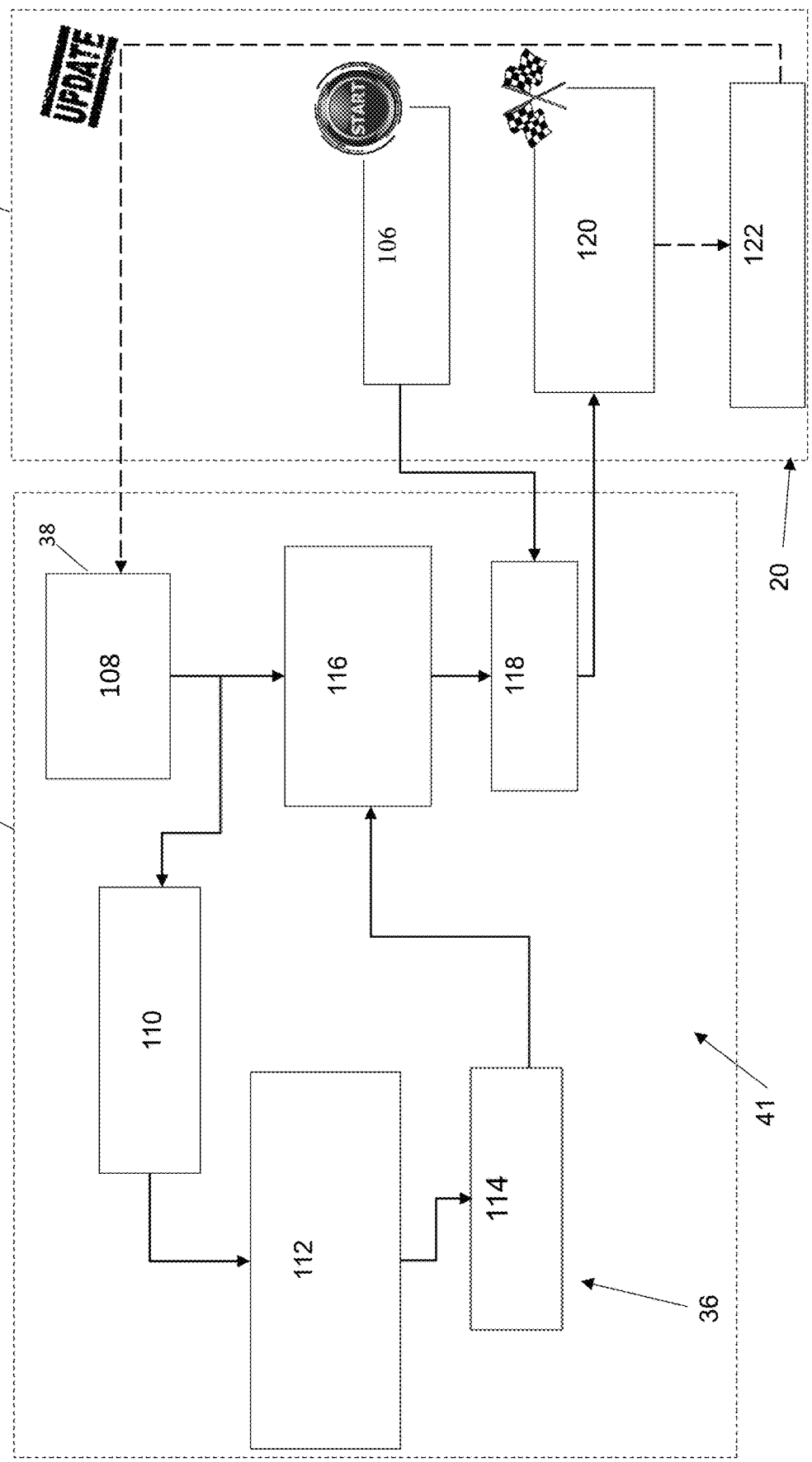
FIG. 4 is an overview drawing in the form of a block diagram for the units and the sequence of a process running in the device for requesting the spare parts.

FIG. 4 shows a block diagram of the system contained in the device according to FIG. 1 implemented by the computer unit 34, the network 32, and the data processing system 30, together with the storage devices 36, 38 and the user terminals 28, and of the method running thereon for determining which spare parts are requested and should be provided together, because they are probably required together for particular maintenance and/or repair purposes to fulfil the maintenance and/or repair task.

The reference numerals in the blocks of FIG. 4 mean:

106 Request for a spare part, for example by entering a spare part number (example of a spare part identifier) from a customer, in particular the personnel 18 of the maintenance and/or repair organization 20

108 Information on previous transactions, for example the history of previous requests

110 Check spare part identifier in the technical documentation

112 Create table of interconnected spare parts identifiers from the technical documentation

114 Technical information about spare parts (technical documentation—including information about the installation location)

116 Data mining (machine learning)—search for frequent patterns in data related to spare part identifiers

118 Results table/result model

120 Suggestion of additional spare parts (for example "you should also request No. X")

122 Information on transactions of the specific maintenance and/or repair organization 20 (for example, history of previous requests)

The method sequence for determining spare part groups that are likely to be needed together is based on the following concept.

In the computer unit 54, from the history of previous transactions with all the spare parts 40, 50, 60 to be supplied, a piece of information 108 about previous transactions is generated and stored in the transaction information storage device 38. The various information 108 about all previous transactions is generated anyway for administrative purposes, such as for accounting or other commercial purposes. Although these data have so far not been generated for technical purposes, they nevertheless also have technical content or rationale. It is possible to ascertain from them the fact that previous maintenance and repair organizations 20 have requested certain spare parts 40, 50, 60 together. This can be due to different reasons, such as, in particular, organizational or commercial reasons. A main reason why spare parts may be requested together, however, is actually technical in nature, because for certain maintenance or repair operations, these spare parts are simply required at the same time to perform the maintenance or repair. In the method described here, this information on previous transactions is filtered and evaluated based on its technical content.

First of all, the commercial data on transactions allow a retrospective analysis of the requesting behavior of maintenance and repair organizations 20 to be supplied.

In addition, the technical documentation 114 is consulted regarding the technical specification of the spare parts 60, including information about their location installation on the aircraft and therefore their interaction with other spare parts 40, 50.

The correlation of commercial and technical data provides information about how a maintenance or repair is performed and/or prepared.

From this analysis, it is possible:

to identify correlations between spare parts 40, 50, 60 due to their technical relationships identify additionally affected parts, which do not appear in the commercial transaction data to set up a machine learning model using the request patterns for specific parts and specific maintenance and repair organizations This machine learning model (e.g., with an output in the form of a table 118) may produce, in particular, a technical correlation between spare parts 40, 50, 60. In particular, data can be generated for the probability that if a first spare part 60 is requested then another specific spare part 40, 50 is predicted also to be required.

This probability can be used to display the other spare part 40, 50 and the recommendation of the request for the other spare part via the information output unit 26. The personnel 18 can then, if necessary, request via the request unit 24 one or more of the other spare parts 40, 50, so that all required spare parts 40, 50, 60 can be supplied via the supply device 22 at the same time, or nearly at the same time.

In one exemplary embodiment, it is therefore indicated to the personnel 18 on the user terminal 28 that another spare part is expected to be required. Thus, the personnel 18 learn, even before the part of the aircraft 12 to be serviced is removed and the degree of wear of the individual spare parts can thus be determined, that not only will the first part 60 probably need to be replaced, but another spare part 40, 50 as well. Thus, right from the outset all spare parts required for a particular maintenance and repair task are supplied, so that substantial time can be saved for the maintenance and repair task and the aircraft can thus be back in flight operations 12 again sooner.

In another embodiment, at least one information output unit 26 is implemented as a machine-readable unit or communication unit and connected to the supply device 22 to pre-fill the magazine 54 of the automatic vending machine 42 and, in particular, to determine the grouping 61 of the spare parts in the individual magazine compartments of the spare-part group vending machine 102. In this case, the information output unit 26 can have a communication connection between the computer unit 34 and the supply device 22. For example, appropriate information can be passed to a computer-implemented logistics system, which then fills the automatic vending machine 42.

In addition, the machine learning model can also support service providers of the manufacturer 40 of the aircraft 12.

In particular, developers and designers can be made aware that certain spare parts or spare part groups are used relatively frequently and/or relatively frequently used together. This information can be used in the future development of the parts of the aircraft 12.

The information reproduced in FIG. 4 at 108 about previous transactions includes, among other things, the information about previous transactions of the specific maintenance and repair organizations 20. A problem here can be that the mere analysis of the transactions that have been only made with a particular maintenance and/or repair center 14 do not provide a high enough accuracy for making predictions. Therefore, it is preferable to analyze as many transactions as possible with all maintenance and repair organizations to be supplied and with all parts of the specific type of aircraft 12. For example, if the information 108 about previous transactions contains a history of requests by all organizations for spare parts 60 over 5-20 years, the prediction accuracy is increased. A significant effect on the accuracy of the prediction as to which spare parts 40, 50, 60 are expected to be needed together for maintenance and repair purposes, is provided by the technical documentation.

In one embodiment, suggestions are made to the maintenance and repair organization 20, in particular on the information output unit 26 provided on a user terminal 28, to also request another spare part 50, 40 (at reference numeral 120). Such a proposal, instead of an obligatory joint supply, takes into account different reasons why the spare parts 40, 50, 60 are not requested jointly from the outset. One reason may be that the other spare part 40, 50 does not need to be replaced. Based on the suggestion that another spare part 40, 50 should be replaced, the personnel 18 can check the condition of this other spare part 40, 50 on the aircraft 12 and make a request or not, according to the result of this check.

Another reason why this specific maintenance and repair organization 20 may not need to request the proposed other spare part 40, 50 could be that this other spare part 40, 50 is already in stock at the maintenance and repair center 14.

Another reason why the proposed spare part 40, 50 may not be requested could be that the specific aircraft 12 currently undergoing maintenance or repair at the maintenance and/or repair center 14 has a configuration in which this other spare part 40, 50 is exceptionally not required.

In one embodiment of the device 10 it is designed to query the specific configuration of the aircraft 12 and store this additional information in the spare part information storage device 36. This can be used as a further filter for the proposal for related spare parts 40, 50, 60.

Specific relationships and replacement options from the technical documentation 114 can also be taken into account.

FIG. 5 shows an example of a request history of spare parts 40, 50, 60 and thus an example of a part of the content of the transaction storage device 38, which is taken into account at 108 in FIG. 4.

FIG. 6 shows the information from FIG. 5 with the following additional information:

130 the transaction history or request history in the frame labelled as 130 gives an overview of the maintenance and repair organizations 20, which includes the related parts, their quantity and the date requested. This allows request patterns to be found and the volume of the requested spare parts to be analyzed.

FIG. 7 shows the information from FIG. 5 with the following additional comment:

132 in the data shown in FIG. 5, 37 maintenance and repair organizations 20 request at least one of the identified replacement parts. Taking into account the technical documentation, it turns out that none of these organizations requested all technically related spare parts.

It is thus very likely that for the predetermined maintenance and/or repair task one or other spare part was missing and had to be requested retrospectively.

Figure 8:
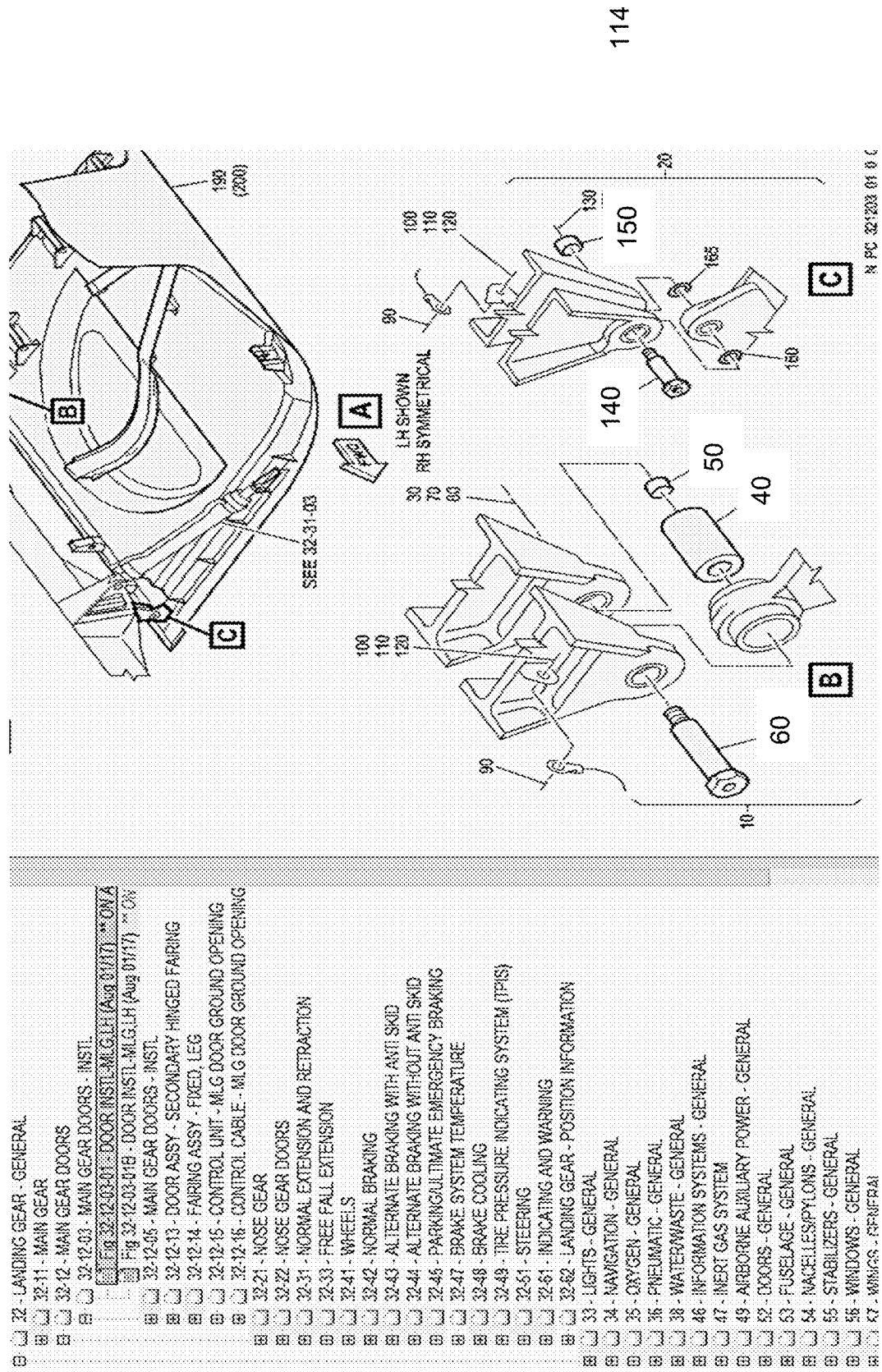
FIG. 8 is a schematic representation of an example of information about available spare parts, including technical documentation, descriptions, spare part identifiers and details relative to the installation location of the respective spare parts in relation to one another.

FIG. 8 shows an example of a part of the content of the spare part information storage device 36. The information includes the name of the spare part 60 and its spare part identifier (the numbers in FIG. 8). The letters A, B and C show and define common modules. The module B contains, for example, the parts 40, 50 and 60 which can be installed together, the module C contains the parts 140, 150 that are installed together. Therefore the installation locations of the spare parts 40, 50, 60 and 140, 150 are identified relative to each other.

Figure 9:
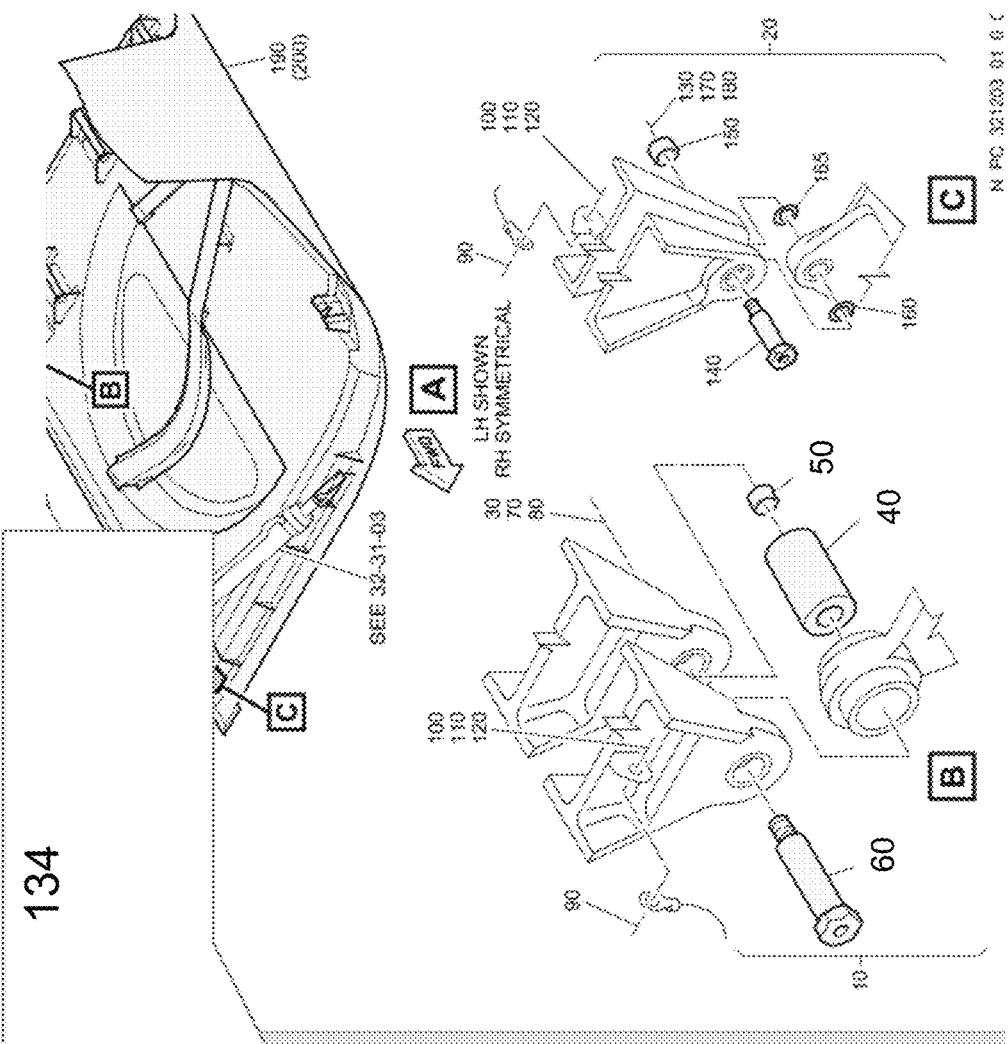
FIGS. 9-13 are the representation of FIG. 8 with additional comments.

FIG. 9 shows FIG. 8 with the following additional explanation:

134 Here the catalogue with illustrated spare parts is specified as a file structure. A simple way to locate spare parts to be installed together at a location is thus to investigate whether these spare parts in this catalogue are displayed together in one level of the file structure.

Figure 10:
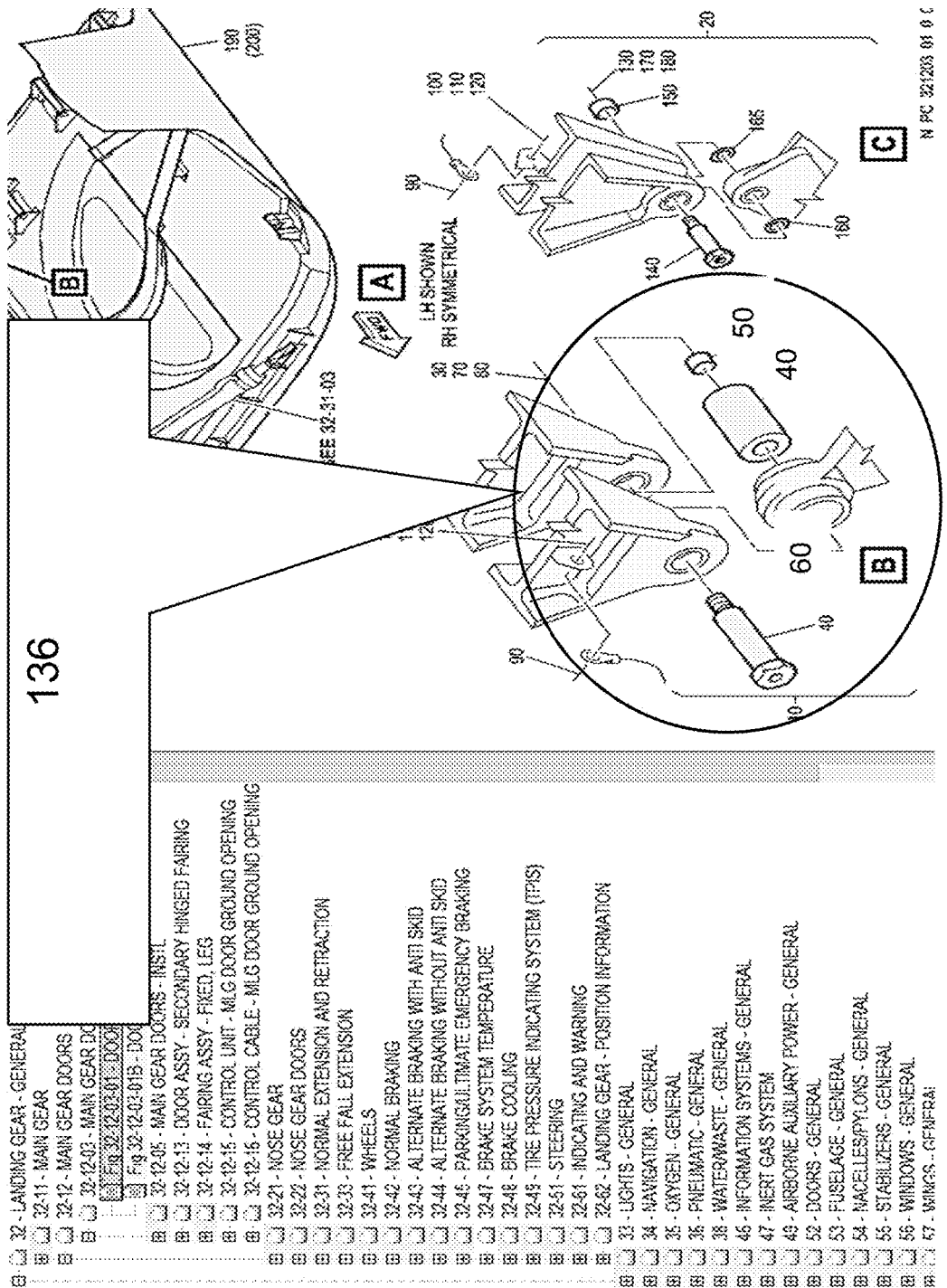

FIG. 10 shows FIG. 8 with the following additional explanation:

136 technically interrelated spare parts 40, 50, 60.

Figure 11:
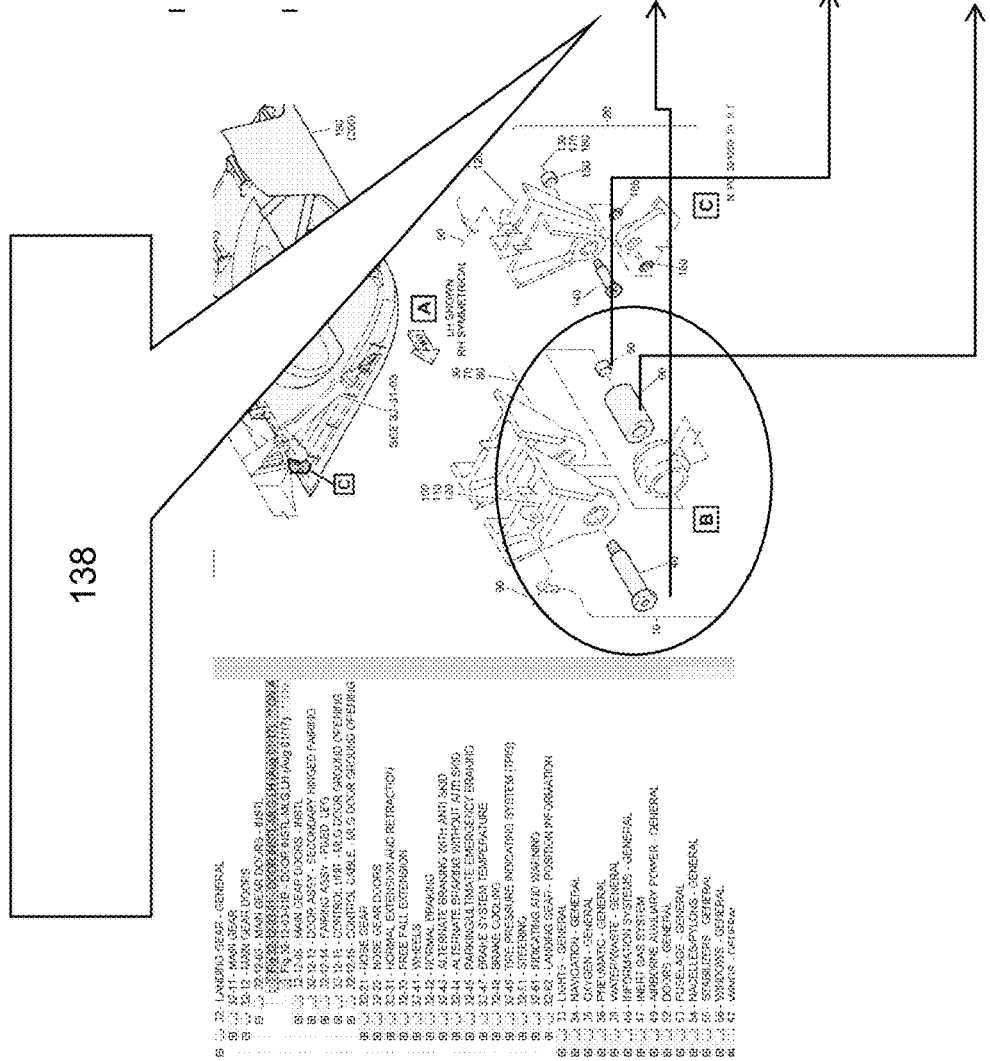

In accordance with FIG. 11, from these technically interrelated spare parts 40, 50, 60 a grouping can be generated of spare part identifiers which are used together in a technical sense, in particular at the same installation location or adjacent installation locations.

The block 138 in FIG. 11 designates:

138 spare part grouping within the fleet of aircraft 12 and their number.

This means that from these technical data it is possible to derive the interrelated spare parts 60 and their quantities and therefore to determine the spare part identifiers and their quantities for the request for specific maintenance and repair purposes.

Figure 12:
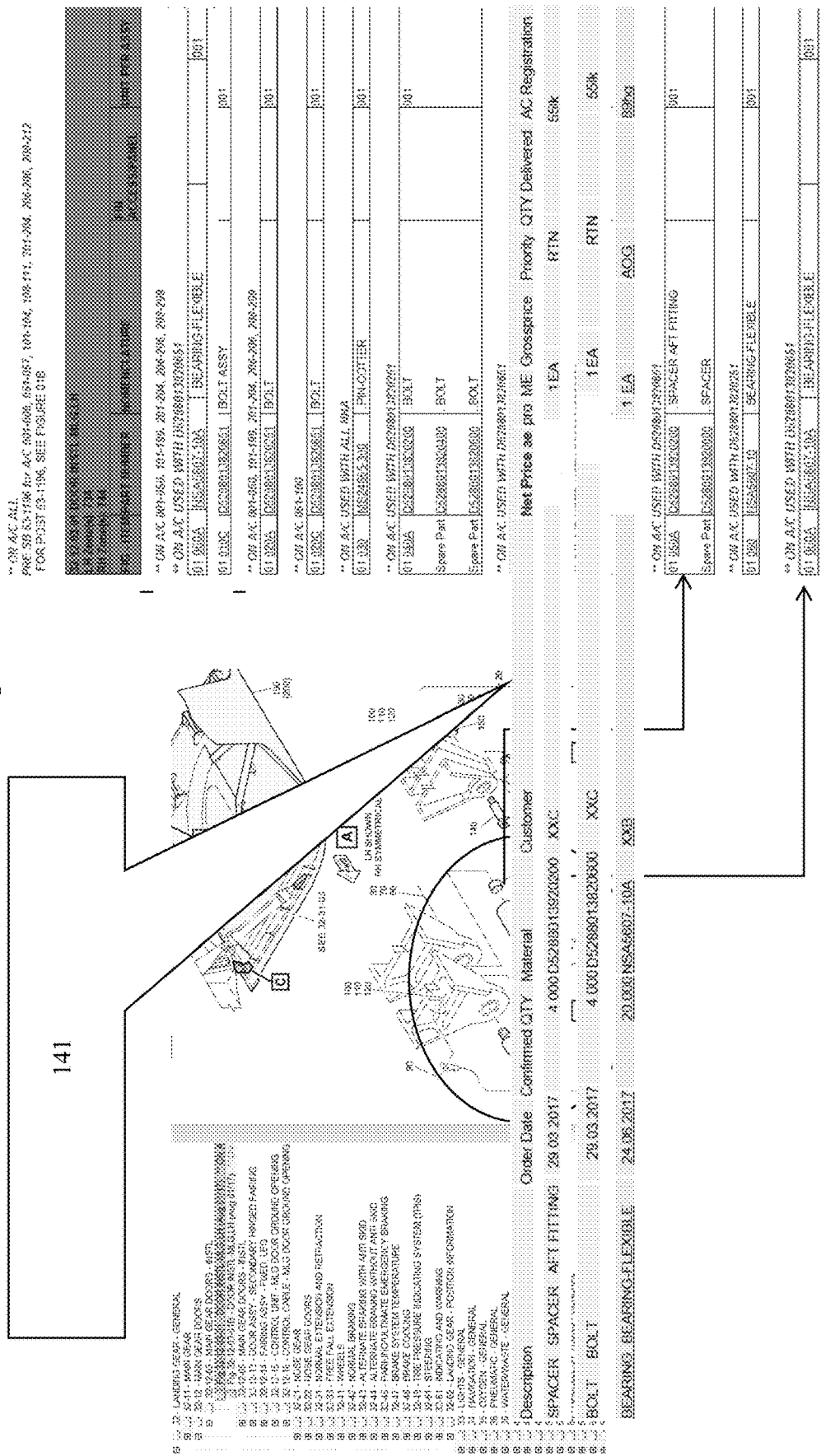
Figure 13:
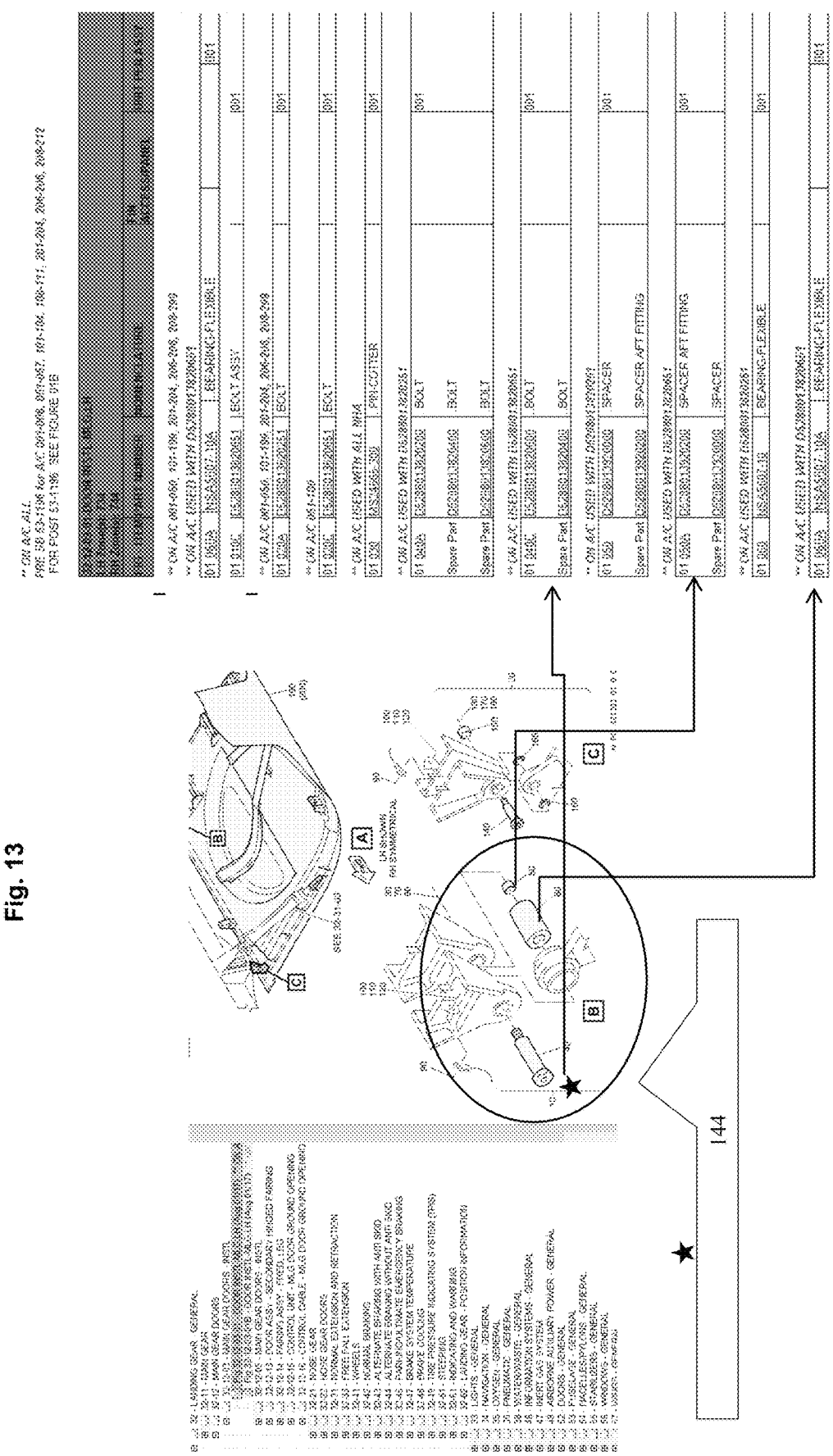
Figure 14:
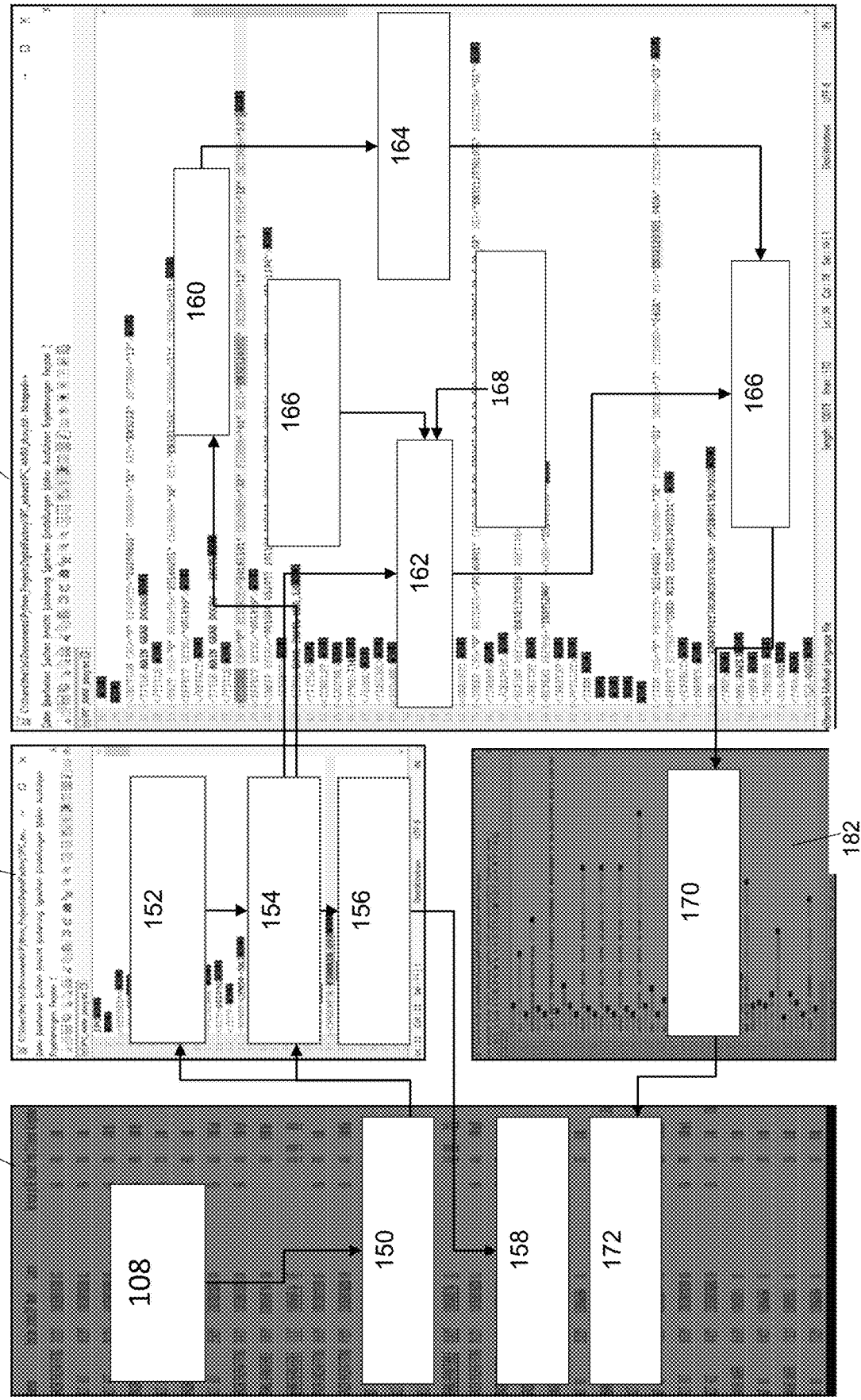
FIG. 14 is an illustration which shows data from previous transactions and technical documentation on individual spare parts, and a flow chart of how these data are processed by computer in the device.
Figure 15:
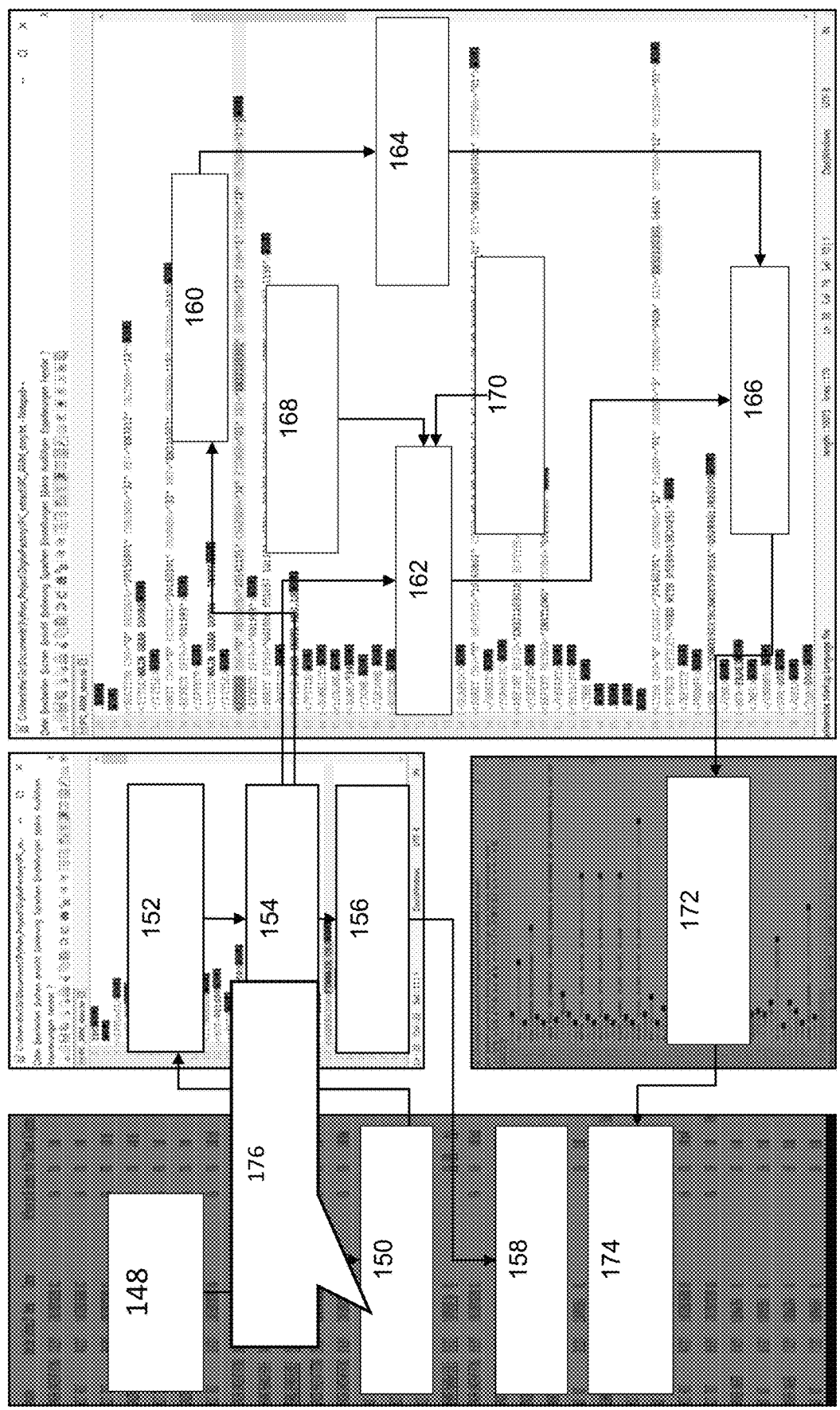
FIGS. 15-20 are the representation of FIG. 14 with additional comments.
Figure 16:
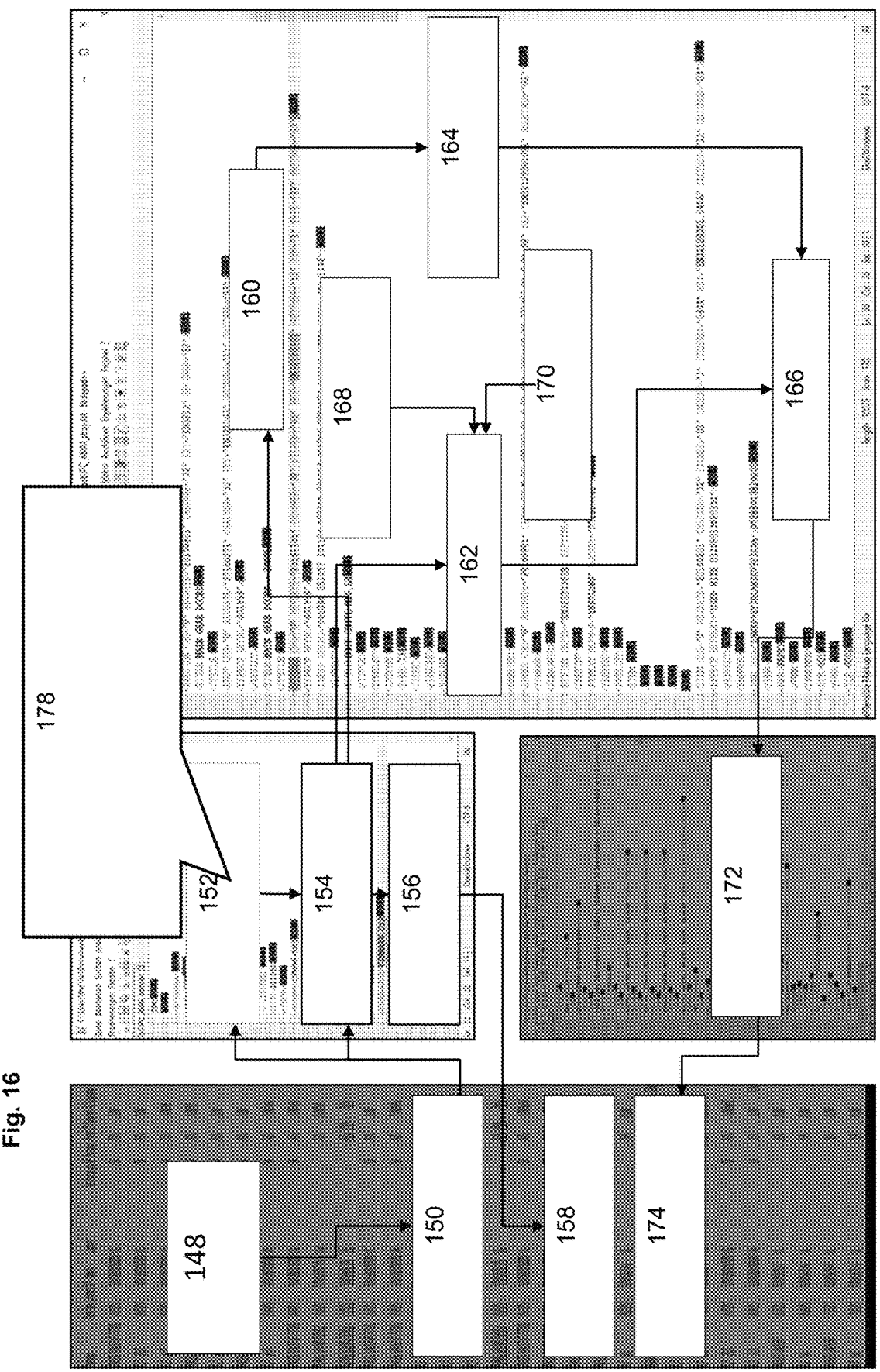
Figure 17:
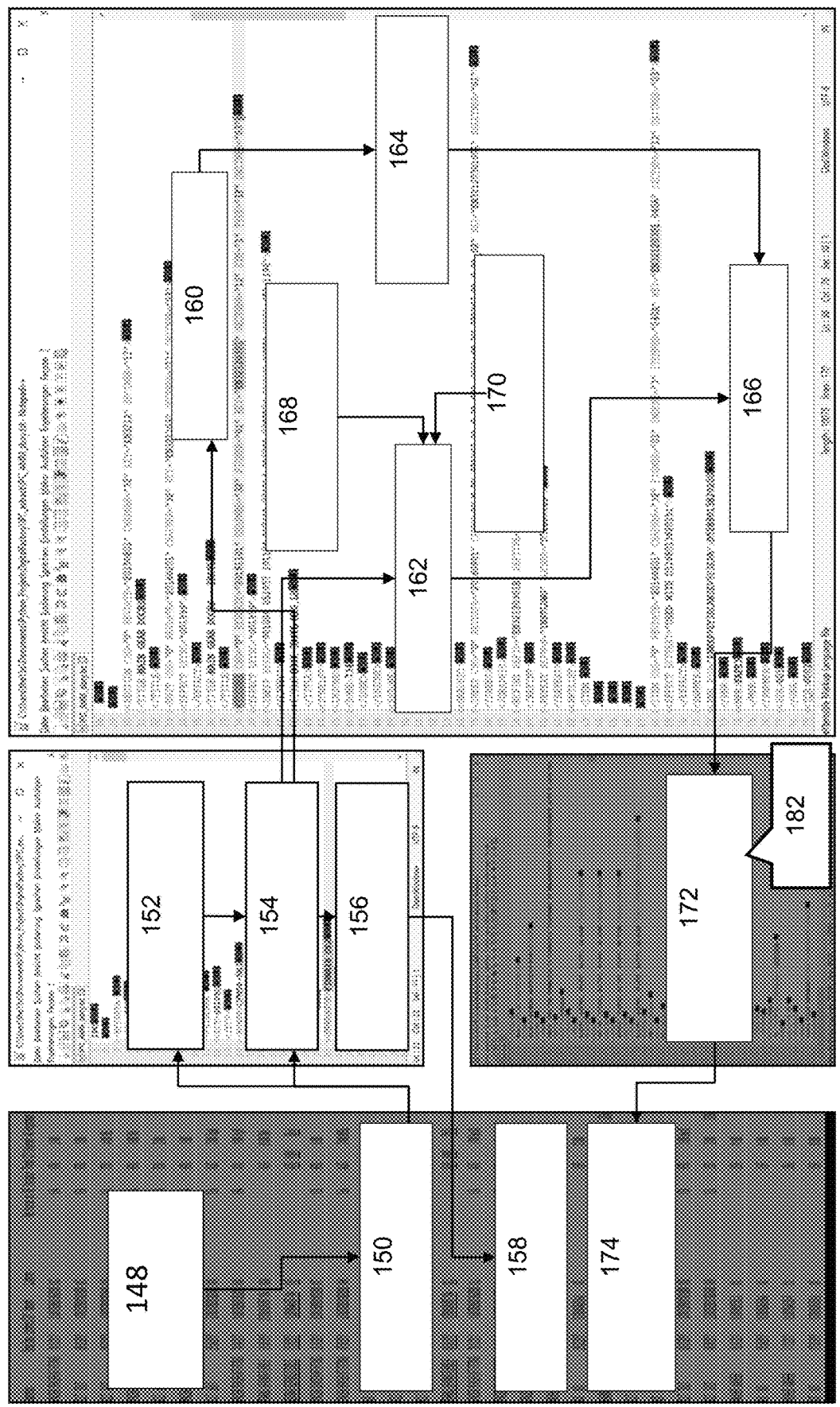
Figure 18:
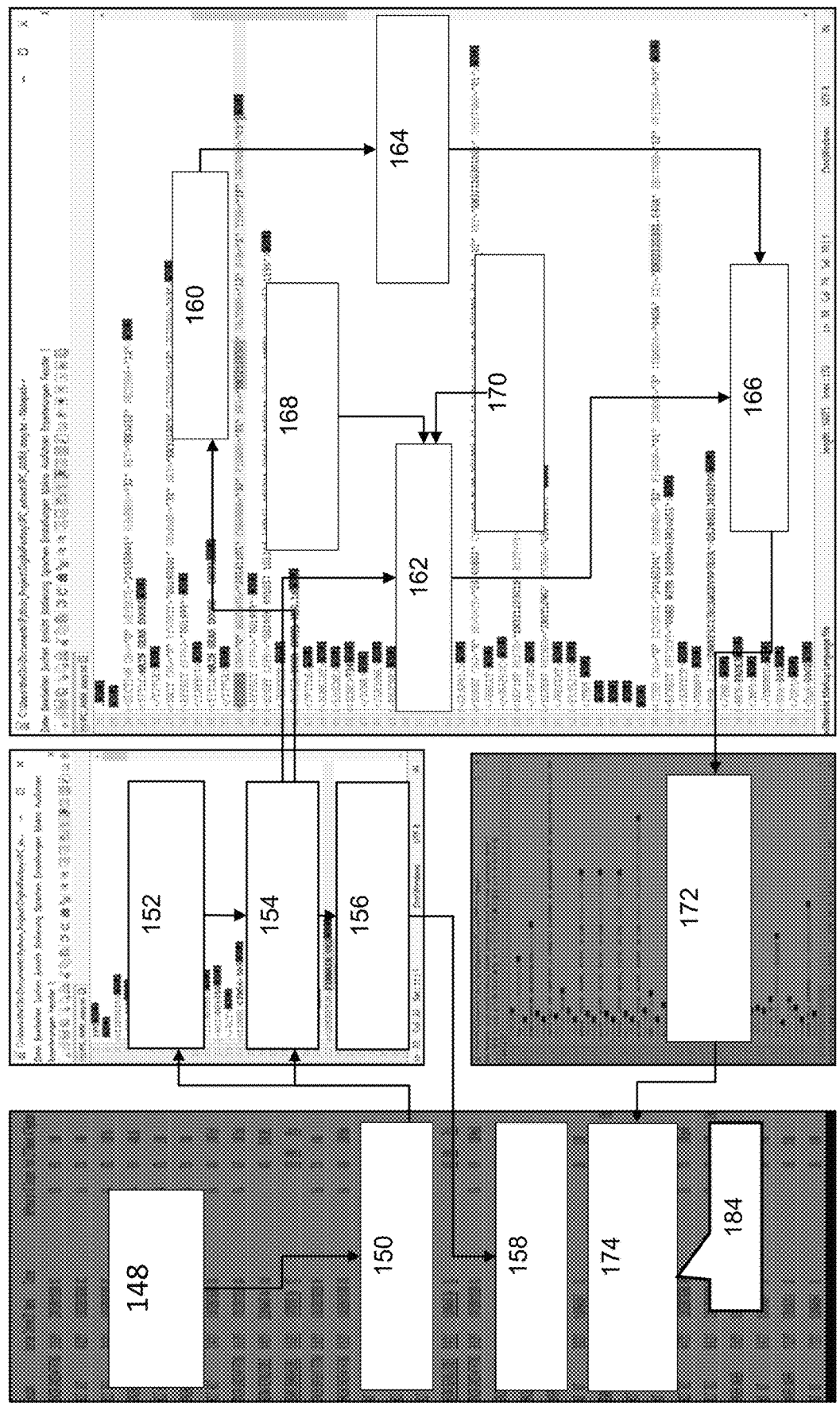
Figure 19:
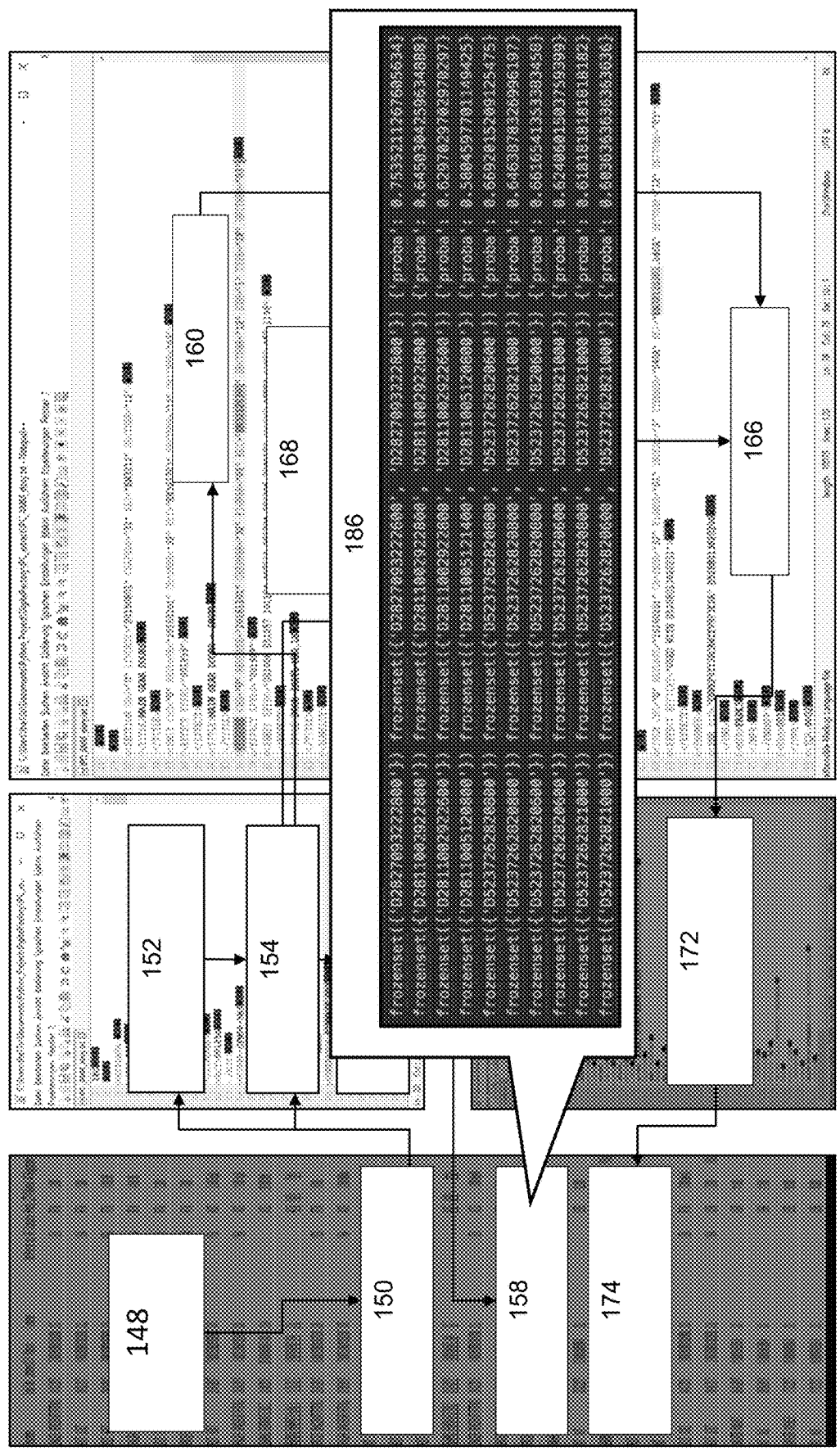
Figure 20:
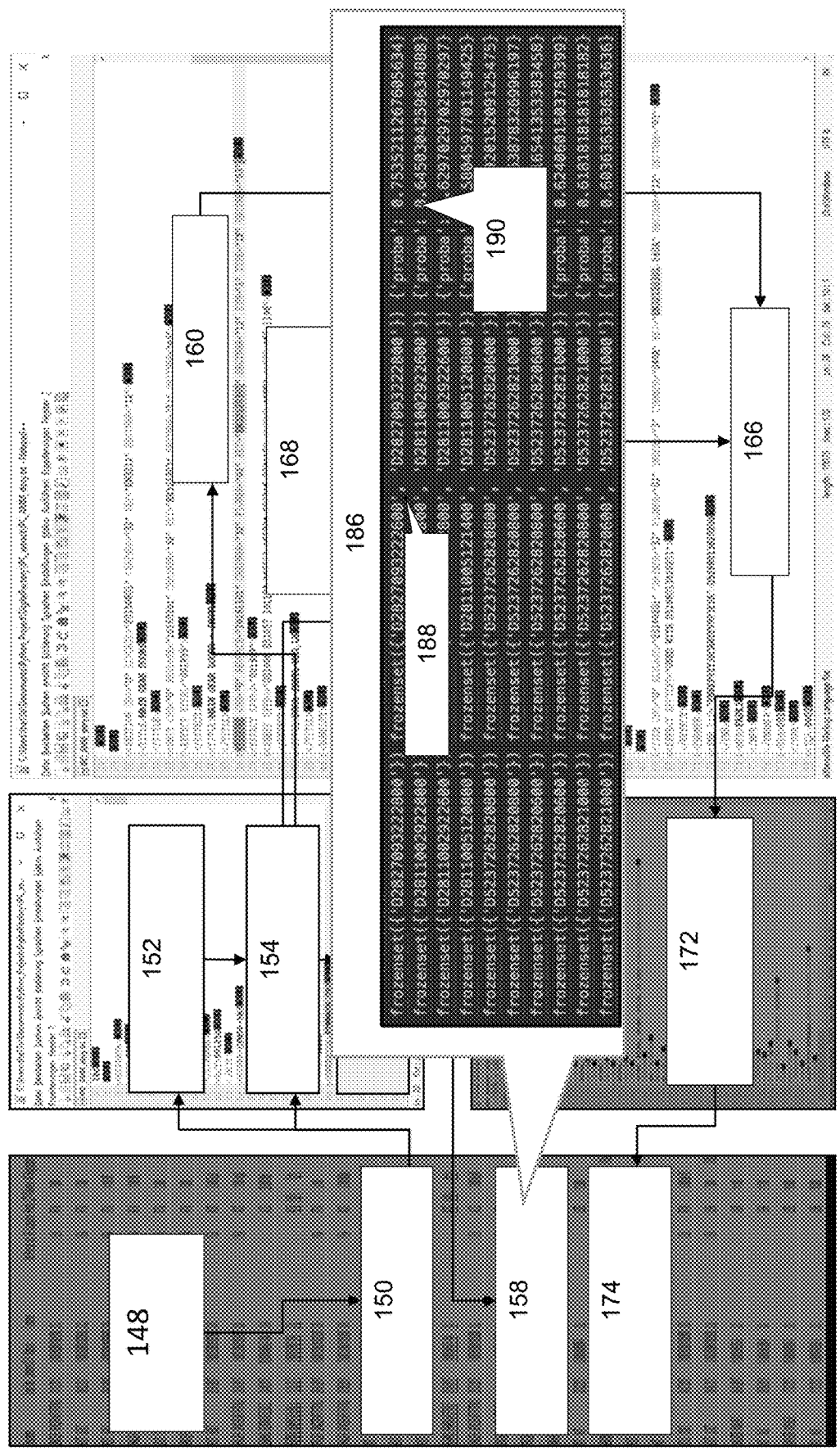

In FIG. 12, the information from the history of previous transactions and the information from the technical documentation are correlated with each other. The reference numeral 141 means:

141 Comparison of requirement patterns—correlation of commercial and technical data In the following, reference is made to FIG. 13, which in turn shows the contents of the relevant technical documentation and the grouping of spare parts that can be derived therefrom.

In 142, the following first hypothesis is made:

If the bolt marked with* must be replaced, it is very probable that the spare parts related to it also need to be replaced, since the same loads, torques and tensile stresses prevail in this area.

At 144, the following second assumption is made:

Because of these relationships, at least three different spare parts 40, 50, 60 are required (identified via the spare part numbers as an example of the spare part identifier). It is probable, however, that not only are the three different spare parts 40, 50, 60, which have a fastening on the one side required, but the corresponding parts 140, 150 of the fastening on the other side also, so that it is highly likely that six different spare parts are required (identified via the spare part numbers as an example of a spare part identifier).

In the following, on the basis of FIGS. 15-21 an exemplary embodiment will be described in detail of specific calculations for locating spare parts correlated with a first spare part and for calculating the probabilities for pairs of spare parts (examples of a group of spare parts) and the probability that if a spare part from the pair is required, the other spare part is also required. For the calculation, information 108 about the previous history of transactions and technical documentation with relevant technical information 114 about the respective spare parts 40, 50, 60 are applied. For the technical information 114, as already explained above, electronic data on an illustrated spare parts catalogue 134 are used. Further, maintenance instructions 180 for performing certain maintenance and repair operations are used, which are also available in electronic form. In the present exemplary embodiment maintenance interval information 182 is also used, which specifies the intervals at which the modules of the aircraft 12 are to be serviced.

The individual blocks in FIGS. 15-20 refer to the following:

108 Information about the previous history of transactions and technical documentation with relevant technical information

151 {PNR}—here in the following all data from the predecessors for each spare part identifier, which can be obtained from the previous request history

152 {PNR: OPT_PNR}—search for optional additional spare part identifiers that are technically associated with the initial spare part identifier

154 {PNR: (UWP, CSN, FIN)}
156 {PNR: (FIGURE, ITEM, CSN, FIN)}
158 {PNR: PNR_association}
160 {SUBTASK_ID: CSN}
162 {TASK_ID: FIN}
164 {SUBTASK_ID: TASK_ID}
166 {TASK_ID: MPD}
168 {TASK_ID: REF_TASK}
170 {SUBTASK_ID: REF_TASK}
172 {MPD: (AMM_ID, Interval)}
174 {PNR: Interval}

176 The spare part identifier is extracted from the history of the previous requests

178 From the information about the spare parts and their spare part identifiers specific to the aircraft fleet of the aircraft 12—including the special and specific interchangeabilities), spare part identifiers related to the spare part identifier to be examined here are extracted. To this end, the joint references to the spare parts in different areas of the catalogue and in different figures of the catalogue are listed and extracted, and the spare part identifiers mentioned together with the initial spare part identifier are identified.

For example, the service instruction 180 in the form of a maintenance manual contains information about the particular maintenance tasks and the instruction as to whether or not a part needs to be replaced. This can be a replacement under certain existing conditions, an unconditional replacement, a renewal, etc.

182 the maintenance interval instruction provides information about the interval in which a specific maintenance task must be performed, which allows an indication of a probable spare part replacement pattern.

184 the probable spare part replacement pattern from the maintenance interval specification helps with an additional data mining step to improve the accuracy of the spare part recommendation.

186 from this information, the probabilities are calculated for the pairings of spare parts—identified by the spare part identifiers, in particular spare part numbers, and in particular from the data records of the previous transactions for all technically interrelated spare parts. This process takes into account the pairings or other groups of spare parts, which according to the technical documentation are associated with each other. The probabilities are calculated in particular from the previous requests, which involves examining how often the other spare part from a pair or group has been requested when the first spare part has been requested. This results in a probability with a value between 0 and 1 (0% to 100%).

188 The combination of the spare part numbers is specified here

Figure 21:
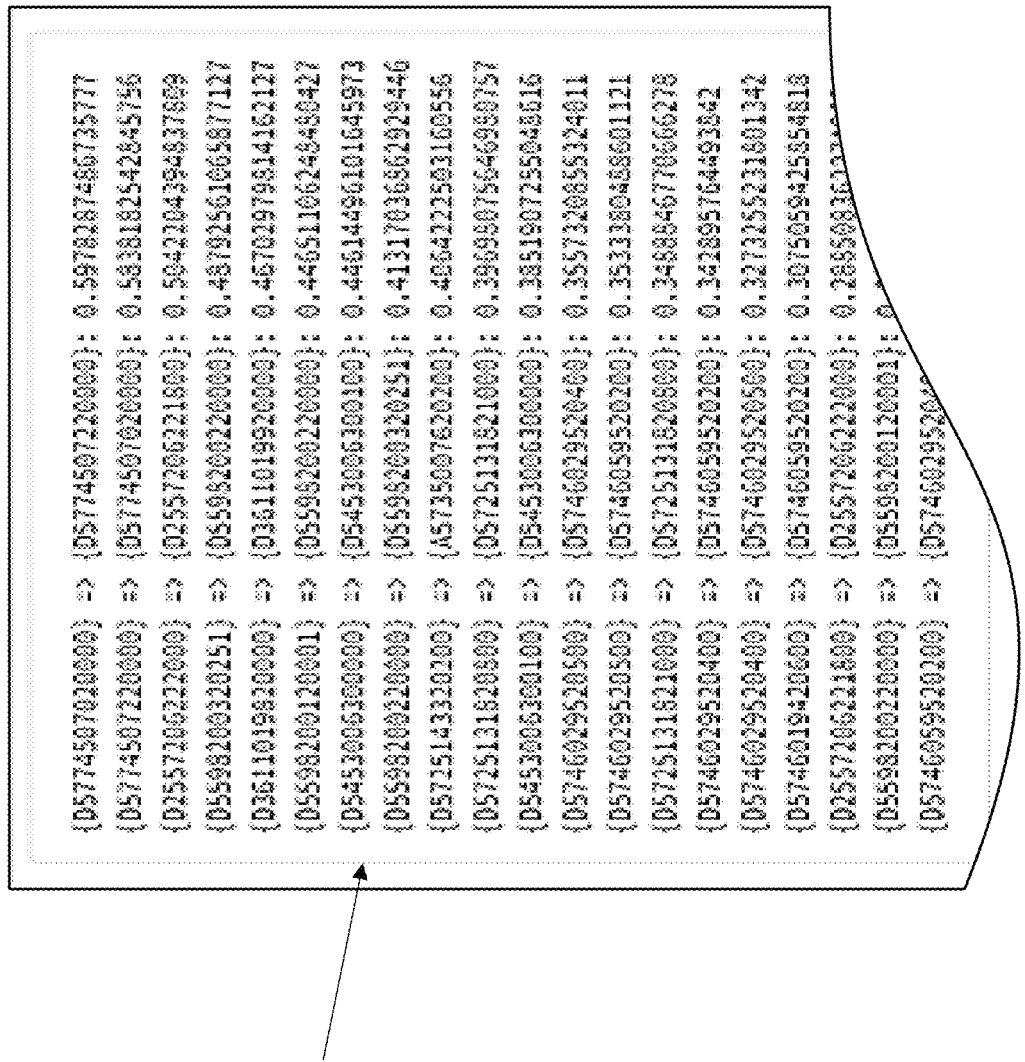
FIG. 21 is a representation of one of the probabilities of groupings of spare parts, obtained by the processes described on the basis FIG. 14-20.

190 Here, the probability of the combination of spare part numbers is specified as the result from the technical documentation and the correlation with the previous requests FIG. 21 shows examples of probabilities for certain pairings of a first spare part and a second spare part.

A threshold value can now be set for the probability. Further, different thresholds can be set for different information items.

If these data are available for the different pairings, it is possible, for example when a particular first spare part is requested, to search for whether this is part of a pairing with another spare part, where a probability is above one of the threshold values. Then a corresponding recommendation can be issued via the information output unit 26.

The table of FIG. 21 is an example of the table 118 from FIG. 4.

This table 118 represents one output of the calculation procedure for calculating probabilities for when the first spare part from a group—here a pair—is requested, another spare part from the group is required. This table 118 can be supplied, for example, to the data processing system 30 for the purposes of a request process, or it is used in the computer unit 34 upon the request of a first spare part 60 to express a recommendation for the request of one or other spare parts 40, 50.

This table 118 is used, for example, as a basis for filling the compartments of the magazine 54 of the spare-part group vending machine 102. Spare parts that are highly likely to be required together will be grouped together to form the group 61 and then supplied for the specific maintenance or repair task.

In the table 118 of FIG. 21, the first column specifies the first spare part A, the second column specifies another spare part B, and the third column specifies the relationship between spare part A and spare part B as a probability value in the range from 0 to 1. For example, for the request for the spare part with the identifier D5774507020000 a probability of approximately 0.5978 is obtained that the spare part with the number D5774507220000 is required.

The information that 60% of all users who requested part D5774507020000 have also requested part D5774507220000 can therefore be output via the information output.

Figure 22:
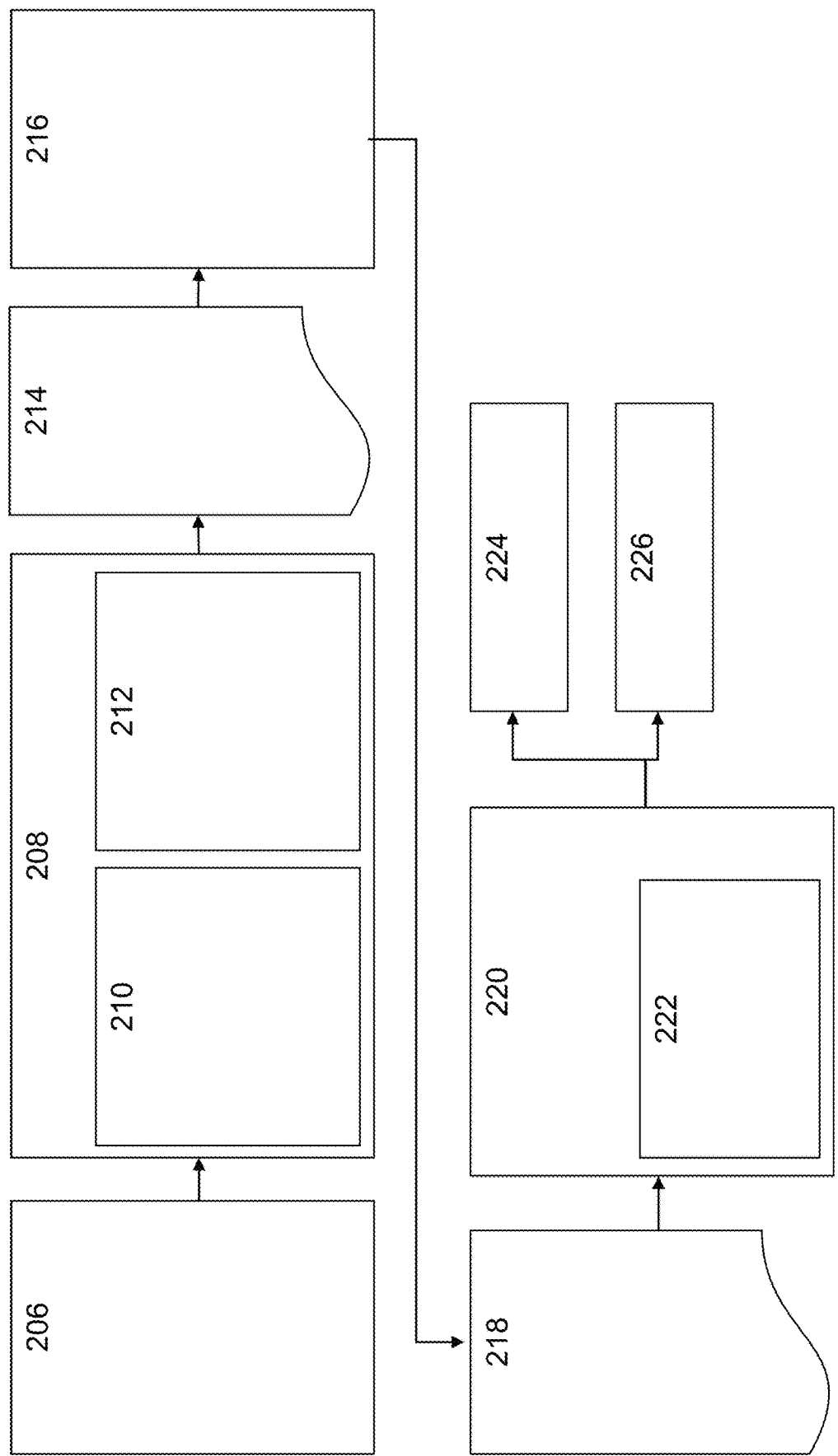
FIG. 22 is an overview of the logic used to obtain groups of spare parts that should be logically requested together.

FIG. 22 provides an overview block diagram of the procedure as well as the calculation. The individual blocks have the following meanings:

206 Collecting commercial data, for example history of previous requests

208 Enrichment of the information with technical data—using specific information about the structure of technical groups

210 Apply filter from the technical function to the commercial data

212 Create interchangeable families

214 Enter the data frame thus generated

216 Perform a pattern recognition by means of data mining

218 Obtain results data frame (e.g. in the form of the table 118).

220 Decoding of the result according to the specific maintenance and repair task (generate specific information for the specific maintenance and repair task from the general result)

222 Search for the actual spare part to be used for the specific maintenance and repair task

224 Use result in internal application

226 Inform personnel 18 of the result.

With the result, on the one hand, depending on the size of the probability the user can be informed. If the probability is very high, the user can be informed that when they request a first spare part they also need a specific second spare part. This allows the user to request all spare parts expected to be required at an early stage.

If the probability has a lower value, an appropriate information message can be output with a lower priority. The user can then check whether the specific additional spare parts indicated are worn and may need to be replaced. Thus the risk of repair being necessary between maintenance intervals can be reduced.

In addition, from the information on the spare parts having a high degree of probability of being related, a grouping of spare parts which are provided together can be performed.

By correlating the maintenance events with the age of the fleet of the aircraft 12 and their distribution, it is possible to obtain additional information relating to how likely it is that spare parts will be needed when, where and in what quantity. The supply device 22 can then be pre-controlled, so that the spare parts 40, 50, 60 are available "on-time" at the maintenance and repair center 14.

As a result, the downtime of the aircraft 12 during a maintenance procedure can be reduced. The procurement of spare parts can also be arranged at an early stage. It is also possible to schedule such spare parts that require a longer production time/delivery time.

All this leads to a reduction in downtimes for the aircraft 12.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS 10 device
12 aircraft
14 maintenance and/or repair center
16 hangar
18 personnel
20 maintenance and repair organization
22 supply device
24 request unit
26 information output unit
28 user terminal
30 data processing system
32 network
34 computer unit
36 spare part information storage device
38 transaction information storage device
40 spare part
41 manufacturer
42 automatic vending machine
44 transport device
46 spare parts supplier
48 special spare part production
50 spare part
54 magazine
56 automatic vending machine output
60 spare part
62 special tool
100 single spare-part vending machine
102 group spare-part vending machine
104 spare part manufacturing device
106 request for a first spare part
108 information on previous transactions
110 check spare part identifier in the technical documentation
112 create table of related spare parts identifiers from the technical documentation
114 technical information about spare parts (technical documentation)
116 data mining (machine learning) for frequent patterns in associated spare part identifiers
118 results table (results model)
120 suggestion for additional spare parts
122 information on previous transactions of the specific maintenance and repair organization 20
130 overview of maintenance or repair organizations that have enacted transactions
132 Example: here 37 of the maintenance and repair organizations have not requested all spare parts from a group of spare parts
134 illustrated parts catalogue (electronic, as a tree structure)
136 technically related spare parts
138 spare part grouping within the fleet of aircraft and their number
140 part from module C
141 comparison of request data pattern—correlation of commercial and technical data
142 assumption: Bolt 60 must be replaced 4 jointly used spare parts 40, 50 will probably also need to be replaced
144 assumption: If group 40, 50, 60 need to be replaced together, then also group 140, 150 that can replace them
150 part from module C
151 {PNR}—spare part number from transaction information 108
152 {PNR: OPT_PNR}—search for optional additional spare part numbers technically associated to the initial spare part number
154 {PNR: (UWP, CSN, FIN)}—search for technical relationships in levels of the file structure
156 {PNR: (FIGURE, ITEM, CSN, FIN)}—search for pairings in figures, etc.
158 {PNR: PNR_association}—Compilation of pairings of spare part numbers, which belong to technically associated spare parts in accordance with 152, 154, 156
160 {SUBTASK_ID: CSN}
162 {TASK_ID: FIN}
164 {SUBTASK_ID: TASK_ID}
166 {TASK_ID: MPD}
168 {TASK_ID: REF_TASK}
170 {SUBTASK_ID: REF_TASK}
172 {MPD: (AMM_ID, Interval)}
174 {PNR: Interval}
176 extraction of the spare part identifier
178 extraction of the correlated spare part identifier
180 maintenance instruction 182 service interval information
184 use of a probable spare part replacement pattern generated from the service interval information to improve the spare part recommendation
186 computations of probabilities for pairs (example of group) of spare parts, which indicate the probability with which a request for a first spare part also means that the other spare part is requested
188 associated spare part numbers
190 probability of the joint requirement for the spare parts belonging to the associated spare part numbers
206 Collecting commercial data, for example history of previous requests
208 Enrichment of the information with technical data—using specific information about the structure of technical groups
210 Apply filter from the technical function to the commercial data
212 Create interchangeable families
214 Enter the data frame thus generated
216 Perform a pattern recognition by means of data mining
218 Obtain results data frame (e.g. in the form of the table 118).
220 Decode the result according to the specific maintenance and repair task (generate specific information for the specific maintenance and repair task from the general result)
222 Search for the actual spare part to be used for the specific maintenance and repair task
224 Use result in internal application
226 Inform personnel 18 of the result.

The invention claimed is:

1. A device for providing spare parts of an aircraft to at least one of a maintenance or repair center for the aircraft, comprising:
 a spare part information storage device, which contains information about each available spare part of the aircraft, including a spare part identifier and its installation location relative to other available spare parts,
 a transaction information storage device, which contains information about previous transactions for each available spare part,
 a computer unit,
 a request unit for requesting a spare part,
 an information output unit, and
 a supply device for supplying a requested spare part,
 wherein the computer unit is configured to calculate, for groups of at least two each of the available spare parts, based on the information about previous transactions and the information on the installation location relative to other spare parts, a probability value that a need for a given first spare part from one group of the groups will mean that a different spare part from the one group is also needed for a maintenance or repair operation,
 wherein the computer unit is configured, when a spare part is requested, to check whether a probability value that the need for this requested spare part from the one group implies that a different spare part from the one group is also needed is above a predetermined threshold or not, and if the probability value for the other spare part is above the threshold, to output the spare part identifier of the other spare part via the information output unit.

2. The device according to claim 1, wherein the supply device comprises an automatic vending machine at the maintenance or repair center, wherein the automatic vending machine comprises a magazine for spare parts to be supplied, and an automatic vending machine output for issuing the requested spare part.

3. The device according to claim 2, wherein at least one of the
 automatic vending machine is configured to deliver information about transactions enacted on the automatic vending machine to the transaction information storage device,
 the magazine contains the available spare parts, for which a number of transactions determined from the information provided by the transaction information storage device is above a predetermined threshold,
 the magazine contains groups of spare parts, in which the probability value that a need for a spare part from one group of the groups means that another spare part from the one group is also needed, is above a predetermined threshold,
 the magazine contains groups of at least one of spare parts or tools, which are needed together in selectable maintenance or repair operations.

4. The device according to claim 2, wherein the computer unit is configured to determine, for each available spare part based on the information from at least one of the spare parts information storage device or the transaction information storage device, a demand parameter that specifies how often the spare part is needed at the maintenance or repair center, and to issue an instruction to fill the magazine on the basis of the demand parameter.

5. The device according to claim 2, wherein the automatic vending machine contains at least one tool for exercising a maintenance or repair operation, wherein said tool can be obtained from the automatic vending machine by a user by way of a transaction to be enacted on the automatic vending machine.

6. A method for supplying spare parts of an aircraft to at least one of a maintenance or repair center for the aircraft, comprising the steps:
 a) supplying spare part information about each available spare part, wherein the spare part information contains a spare part identifier and information about an installation location of the spare part relative to some of the other available spare parts;
 b) supplying transaction information about previous transactions for each available spare part,
 c) calculating, from the transaction information and the spare part information, probability values for groups of at least two each of the available spare parts, wherein a probability value indicates a probability that if a given first spare part is needed from one of the groups, a different spare part from the one of the groups is also needed for a maintenance or repair operation,
 d) requesting a first spare part,
 e) investigating whether a probability value assigned to the first spare part for a grouping with at least one second spare part exceeds a predetermined threshold, and, if the threshold is exceeded, outputting information that the second spare part is probably also needed and outputting a spare part identifier for the second spare part, and
 f) supplying the first spare part.

7. The method according to claim 6, further comprising
 g) waiting before step f) whether or not a request is made for a further spare part, and performing step e) also for this additional spare part, wherein all additional spare parts are provided in step f).

8. The method according to claim 6, wherein step f) includes:

f1) operating an automatic vending machine located at the maintenance or repair center, which has a magazine for spare parts to be supplied and an automatic vending machine output to issue the requested spare part from the magazine.

9. The method according to claim 8, further comprising one, a plurality or all of the following steps:

storing transaction information about by transactions enacted on the automatic vending machine;

identifying from at least one of the transaction information or the spare part information, a number comprising how often each available spare part has so far been needed, and filling the magazine with those spare parts for which this number is above a predetermined threshold;

stocking groups of spare parts in the magazine, for which a probability value that a need for a spare part from one group of the groups implies that another part from the one group is also needed is above a predetermined threshold, and jointly issuing such all of the spare parts from the one group via the automatic vending machine output;

stocking groups of at least one of spare parts or tools in the magazine, which spare parts or tools in one group of the groups are needed together in a predetermined maintenance or repair operation and issuing such all of the spare parts or tool from the one group jointly via the automatic vending machine output; or stocking certain tools, which are needed in certain maintenance or repair operations, in the automatic vending machine and issuing the tools on request.

10. The method according to claim 8, further comprising the step of determining for each spare part to be supplied, based on at least one of the transaction information or the spare part information, whether step f1) is carried out for its provision.

11. A computer program product, comprising commands which during an execution of a program by a computer unit of a device causes said device to carry out a method for supplying spare parts of an aircraft to at least one of a maintenance or repair center for the aircraft, comprising the steps:

a) supplying spare part information about each available spare part, wherein the spare part information contains a spare part identifier and information about an installation location of the spare part relative to some of the other available spare parts;

b) supplying transaction information about previous transactions for each available spare part, c) calculating, from the transaction information and the spare part information, probability values for groups of at least two each of the available spare parts, wherein a probability value indicates a probability that if a given first spare part is needed from one of the groups, a different spare part from the one of the groups is also needed for a maintenance or repair operation, d) requesting a first spare part, e) investigating whether a probability value assigned to the first spare part for a grouping with at least one second spare part exceeds a predetermined threshold, and, if the threshold is exceeded, outputting information that the second spare part is probably also needed and outputting a spare part identifier for the second spare part, and f) supplying the first spare part.

* * * * *